United States Patent [19]
Kametani

[11] Patent Number: 6,161,168
[45] Date of Patent: Dec. 12, 2000

[54] SHARED MEMORY SYSTEM

[75] Inventor: Masatsugu Kametani, Tsuchiura, Japan

[73] Assignee: Hitachi, Ltd., Tokyo, Japan

[21] Appl. No.: 09/165,200

[22] Filed: Oct. 2, 1998

Related U.S. Application Data

[63] Continuation of application No. 08/701,789, Aug. 26, 1996.

[30] Foreign Application Priority Data

Aug. 28, 1995 [JP] Japan ................................. 7-218446

[51] Int. Cl.⁷ ............................................. G06F 15/16
[52] U.S. Cl. ........................ 711/147; 711/150; 711/151; 711/211
[58] Field of Search ................................ 711/147, 148, 711/150, 211, 151, 202; 712/14, 11, 20, 10

[56] References Cited

U.S. PATENT DOCUMENTS

| | | | |
|---|---|---|---|
| 4,153,934 | 5/1979 | Sato | 395/673 |
| 4,833,649 | 5/1989 | Greub | 365/189.06 |
| 5,025,365 | 6/1991 | Mathur et al. | 395/448 |
| 5,079,694 | 1/1992 | Nakagawa et al. | 395/492 |
| 5,146,607 | 9/1992 | Sood et al. | 711/211 |
| 5,361,369 | 11/1994 | Kametani . | |
| 5,388,230 | 2/1995 | Yamada et al. | 395/308 |
| 5,418,952 | 5/1995 | Morley et al. | 712/14 |
| 5,481,747 | 1/1996 | Kametani . | |
| 5,576,997 | 11/1996 | Masuda et al. | 365/189.04 |
| 5,918,229 | 6/1999 | Davis et al. | 707/10 |
| 5,930,502 | 7/1999 | Picco et al. | 711/147 |
| 5,933,857 | 8/1999 | Brewer et al. | 711/202 |
| 5,940,860 | 8/1999 | Hagersten et al. | 711/147 |

FOREIGN PATENT DOCUMENTS

| | | |
|---|---|---|
| 52568 | 1/1993 | Japan . |
| 5290000 | 11/1993 | Japan . |

*Primary Examiner*—John W. Cabeca
*Assistant Examiner*—Fred F. Tzeng
*Attorney, Agent, or Firm*—Antonelli, Terry, Stout & Kraus, LLP

[57] ABSTRACT

A parallel processing system in which access contention of a read cycle from a processing unit side to a local shared memory and a write cycle from a shared bus system side on the local shared memory is reduced and a memory LSI which may be used in such unit are provided. The parallel processing system comprises a local shared memory between the processor and a shared bus. Address and data input means (WA and DI) for writing data to a memory cell and address input means (RA) and data output means (DO) for reading data are provided independently from each other to parallelize operations for reading from the processor side and for writing from the shared bus side.

21 Claims, 10 Drawing Sheets

SHARED MEMORY SYSTEM

This application is a continuation of prior application Ser. No. 08/701,789 filed on Aug. 26, 1996.

BACKGROUND OF THE INVENTION

The present invention relates to a parallel processing system for exchanging information among a plurality of processing units and a memory LSI which may be used in such system.

One type of prior art shared memory system for use in a parallel processing system adopts a mode of operation in which one shared memory is connected to a shared bus system and is utilized by a plurality of processors in common. The shared bus system comprises a shared bus, an arbiter circuit for arbitrating requests for access to the shared bus made by units connected to the shared bus and for permitting such access, units for inputting/outputting data to/from the shared memory and the like as necessary.

There is also an advanced shared memory system as disclosed in Japanese Patent Laid-Open No. Hei. 5-290,000 in which shared memories (memory unit) are distributed to each processor in order to reduce the contention of accesses on the shared bus system. Such a shared memory is memory or distributed occasionally referred to as a local shared memory.

As a shared memory system for use in a parallel processing system comprising such a local shared memory, there is a broadcast type parallel processing system having a mode of operation in which the contents of local shared memories of other processors are also changed, when the contents of the local shared memory of one processor is changed, by broadcasting the changed contents. The above-mentioned system disclosed in Japanese Patent Laid-Open No. Hei. 5-290,000 also belongs to this broadcast type of system.

Each system described above has had the following problems. That is, in a parallel processing system of the type having one shared memory connected to a shared bus system, there has been a possibility that a large amount of read and write cycles from a plurality of processors contend in the shared bus system in a complex manner. Arbitrating this access contention has caused a waste of time on the side of the shared bus system, dropping the throughput accordingly. In connection with this problem, the latency of the processor is also prolonged, thus causing an increase in overhead of the whole processing system.

When the broadcast type shared memory system as disclosed in Japanese Patent Laid-Open No. Hei. 5-290,000 is used, only a cycle for writing data to the local shared memory is generated on the shared bus system. A cycle for reading data from the shared memory is implemented to the local shared memory distributed to each processor independently and in parallel in the unit of each processor. Accordingly, no access contention occurs among read cycles of each processor to the shared memory, thus improving the throughput.

However, even if the broadcast type shared memory system is used, the read cycle from the processor and the write cycle from the shared bus system, with respect to the local shared memory, contend on the local shared memory (access contention of read cycle and write cycle). Therefore, the effect of eliminating the overhead and the waste of time has been found to be insufficient even with a parallel processing system having a broadcast type shared memory system. It is noted that this contention also occurs in other shared memory systems, beside the broadcast type system.

Further, in the parallel processing system having a shared memory system, there is a case wherein the plurality of processors implementing processing in concert needs to pass a task processing result reliably to a succeeding task processing in each task processing. In such a case, it is necessary to take into account a data transfer latency (communication latency) among the processing units, such as the processors.

SUMMARY OF THE INVENTION

Accordingly, it is an object of the present invention to provide a shared memory system and a parallel processing system in which the access contention of a read cycle from a processing unit, such as a processor, and a write cycle from a shared bus system, with respect to a local shared memory on the local shared memory, is reduced, and to provide a memory LSI which may be used in such system.

It is another object of the present invention to provide synchronizing means, which guarantees that data will be reliably passed between tasks upon reducing the access contention on the local shared memory.

The above-mentioned objects may be achieved by providing the shared memory system with a function or means which allows an operation for writing data to the memory unit and an operation for reading data from the memory unit to be executed in parallel.

To that end, according to one preferred aspect of the present invention, the shared memory system is provided with a plurality of memory units which are provided in correspondence with a plurality of processing units between the plurality of processing units and a shared bus system and which store processing results of a corresponding processing unit and processing results of other processing units obtained via the shared bus system; and means for executing operations for writing data to the memory unit and for reading data from the memory unit in parallel.

According to another preferred aspect of the present invention, the inventive shared memory system is provided with a plurality of memory units which are provided in correspondence with plurality of processing units between the plurality of processing units and a shared bus system and which have memory cells which can be specified by an address and which store processing results of a corresponding processing unit and processing results of other processing units obtained via the shared bus system; data input means for selecting either data sent from the corresponding processing unit or from the shared bus system to write to a memory cell within the memory unit by specifying its address; data output means for reading data by specifying a memory cell by its address during the data writing operation performed by the data input means; and write information output means for outputting data written by the processing unit to the memory cell within its corresponding memory unit.

According to a still other preferred aspect of the present invention, the inventive shared memory system is provided with a plurality of memory units which are provided in correspondence with a plurality of processing units between the plurality of processing units and a shared bus system and which have memory cells which can be specified by an address anich store processing results of a corresponding processing unit and processing results of other processing units obtained via the shared bus system; selecting means for selecting data and an address among data and addresses sent either from the corresponding processing unit or from the shared bus system; and write information output means for outputting data sent from the processing unit to its corresponding memory unit and written to the memory cell therein to the shared bus system. The memory unit is provided with write address specifying means for specifying an address where data is written and writing means for writing data to the memory cell at the specified address; and read address specifying means and data reading means for specifying a memory cell by its address to read data during the operation of each of the above-mentioned means for writing data.

The parallel processing system which achieves the above-mentioned objects may be constructed by providing the aforementioned shared memory systems corresponding to the plurality of processing units between the plurality of processing units and the shared bus system so that each processing unit can exchange information via its corresponding shared memory system.

According to one preferred aspect of the present invention, the inventive parallel processing system comprises the plurality of processing units, the shared bus system and the plurality of memory units provided in correspondence with the plurality of processing units between the plurality of processing units and the shared bus system, the memory unit stores processing results of a corresponding processing unit and processing results of other processing units obtained via the shared bus system; and there is further provided means for executing operations for writing data to the memory unit and for reading data from the memory unit in parallel.

According to another preferred aspect of the present invention, the inventive parallel processing system comprises the plurality of processing units, the shared bus system and the plurality of memory units provided corresponding to the plurality of processing units between the plurality of processing units and the shared bus system, the memory unit having memory cells which can be specified by an address and which stores processing results of a corresponding processing unit and processing results of other processing units obtained via the shared bus system; and there are further provided data input means for selecting either data sent from the corresponding processing unit or from the shared bus system to write to a memory cell by specifying its address; data output means for reading data by specifying a memory cell by its address during the data writing operation performed by the data input means; and write information output means for outputting data written by the processing unit to the memory cell within the corresponding memory unit.

According to a still other preferred aspect of the present invention, the inventive parallel processing system comprises a plurality of processing units, a shared bus system and a plurality of memory units provided in correspondence with the plurality of processing units between the plurality of processing units and the shared bus system, the memory unit has memory cells which can be specified by an address and which stores processing results of a corresponding processing unit and processing results of other processing units obtained via the shared bus system; and there are further provided selecting means for selecting data and an address among data and addresses sent either from the corresponding processing unit or from the shared bus system; and write information output means for outputting data sent from the processing unit to its corresponding memory unit and written to the memory cell therein to the shared bus system. The memory unit is provided with write address specifying means for specifying an address where data is written and writing means for writing data to the memory cell at the specified address; and read address specifying means and data reading means for specifying a memory cell by its address to read data during the operation of each of above-mentioned means for writing data.

Further, in order to achieve the aforementioned objects, the inventive memory LSI having a plurality of memory cells is provided with read address specifying means for causing the plurality of memory cells to correspond to read and write addresses to specify a memory cell from which data is read by the read address; reading means for reading the data from the memory cell specified by the read address specifying means; write address specifying means, provided independently from the read address specifying means, for specifying a memory cell to which data is written using a write address; and writing means, provided independently from the reading means, for writing the data to the memory cell specified by the write address specifying means to allow the data read processing and the data write processing to be executed in parallel.

At this time, preferably the write address specifying means is provided with a write address pin for inputting the write address; means for selecting the memory cell specified by the write address; a write enable signal input pin for commanding a writing of the data to the memory cell; and means for generating a write signal corresponding to the write enable signal; the writing means being provided with a data input pin for input of the data; means for setting the data input from the data input pin to an input of the memory cell specified by the write address and for latching the data to that memory cell in response to the write signal; the read address specifying means being provided with a read address pin for inputting the read address; means for selecting the memory cell specified by the read address, the reading means being provided with a data output pin for outputting the data; and means for reading the data stored in the memory cell specified by the read address and for outputting it to the data output pin.

Further, in order to achieve the other object described above, the shared memory system or parallel processing system described above further is provided with means, provided in each processing unit, for outputting a synchronization request signal which turns from inactive to active when a processing ends; and synchronizing means for permitting the processing unit outputting the synchronization request signal to read data from the memory unit corresponding to that processor when all of the synchronizing processing signals from each of the processing units processing in concert have turned active and when a synchronizing processing completion signal have turned active accordingly.

At this time, preferably, there may be further provided a means (local synchronizing interlock circuit) for inhibiting the read processing from the memory unit during a period in which an operation for writing to the memory unit continuously occurs, when it occurs at a point of time when the synchronizing processing completion signal turns active.

Or, preferably, the shared memory system or parallel processing system described above may be further provided with synchronization control for synchronizing a timing when the processing unit reads data from its memory unit and a timing for writing data sent from the shared bus system to the memory unit with one reference clock.

Further, preferably, the shared memory system or parallel processing system described above may be further provided with a read data latch for latching data to be output to the reading means. This read data latch may be provided within the memory unit or the memory LSI or provided outside so as to receive data output from the memory unit.

In the shared memory system constructed as described above, data input means selects either data or an address among data and addresses sent from the processing unit or the shared bus system to write into the memory cell within the corresponding memory unit. The write information output means outputs data sent from the processing unit to the memory unit to the shared bus system. This data is written to memory units of other processing units. Meanwhile, the data output means reads data by specifying a memory cell using its address during the writing operation of the data input means.

As described above, the processing for writing data to the memory cell within the memory unit and for reading data therefrom may be carried out in parallel. Accordingly, the amount of access contention caused by the read cycle from a processing unit to the memory unit (local shared memory) and the write cycle from the shared bus system on the memory unit (local shared memory) may be reduced.

In this way, the memory cell specified to write data and the memory cell specified to read data may be the same. That is, data may be read from the memory cell to which data is being written.

Further, because the memory LSI described above is provided with read address specifying means for specifying a memory cell from which data is read and reading means for reading memory cell and write the data from the specified memory cell and write address specifying means for specifying a memory cell to which data is written and writing means for writing the data to the specified memory cell independently from each other, the data reading processing and the data writing processing may be carried out in parallel. Thereby, the amount of access contention of the read and write cycles on the memory LSI may be reduced.

The synchronizing means monitors a synchronization request signal from each of the processing units which perform processing in concert. This synchronization request signal is output to the synchronizing means when the processing unit finishes a processing and the synchronizing means permits the processing unit which outputs this synchronization request signal to read data from the corresponding memory unit after the synchronization request signals are all present (after turning active). This makes it possible to prevent each processing unit from accessing the local shared memory and from generating erroneous processing results by obtaining erroneous data in a state when necessary information from other processing units performing processing in concert is not written yet to the memory unit (local shared memory) which corresponds to each processing unit.

At this time, the local synchronizing interlock circuit described above may be provided to prevent the processing unit from obtaining old data and from processing old data erroneously by queuing the data read processing of the processing unit until a synchronizing processing completion signal is issued and the data on the local shared memory is actually rewritten.

The synchronization control means synchronizes the whole shared memory system using one clock signal, so that the overhead which otherwise is required for synchronizing each means or processing which operates synchronously may be eliminated, thus improving the communication latency.

Further, the writing processing may be executed regardless of the reading processing because the processing unit latches data read from the memory unit or memory cell by means of the read data latch.

Further, because the inventive memory cell LSI comprises a port used only for writing data; a port used only for reading data; a write address specifying port for specifying an address where data is written; and a read address specifying port for specifying an address where data is read, the data reading processing and the data writing processing may be carried out in parallel.

Further, the memory LSI described above allows the writing processing and reading processing, which have required at least two processing cycles for execution in the past, to be executed in one processing cycle. The shortest cycle of this processing cycle is about 10 ns in an IC or LSI using a CMOS process and is about 5 ns in an IC or LSI using a bipolar CMOS process. Accordingly, while it took about 20 ns in an IC or LSI using the CMOS process and about 10 ns in an IC or LSI using the bipolar CMOS process in the past, the inventive memory LSI allows the writing and reading processing to be executed in less than 5 ns by executing those processings in one processing cycle by allowing them to be executed in parallel.

Using the inventive memory LSI as the memory unit (local shared memory) of the shared memory system makes it possible to form a parallel processing system which can execute processing for reading data from the memory unit (local shared memory) and a processing for writing data to the local shared memory in parallel.

Further, it may be possible to reduce the access contention of write and read cycles by allocating the shared memory system, or the shared memory system using the memory LSI described above, to a plurality of processing units, rather than distributing it to each processing unit.

According to the present invention, there is provided means for carrying out data writing and reading processing to the memory cell of memory unit or memory LSI in parallel, so that the amount of access contention or the data read and write cycles on the memory unit or the memory LSI may be reduced. Thereby, the shared memory system or the parallel processing system in which access contention is reduced and the memory LSI which may be used in such a system may be provided.

Further, there is provided means for monitoring each of the processing units which carry out processing in concert and for permitting each processing unit to read data from the memory unit when the processing of those processing units all finish, so that it is possible to prevent each processing unit from obtaining erroneous data and from generating erroneous processing results.

The above and other related objects and features of the present invention will be apparent from a reading of the following detailed description of the embodiment illustrated in the accompanying drawings, and the novelty thereof will be pointed out in the appended claims.

DESCRIPTION OF PREFERRED EMBODIMENTS

There has been proposed a method of improving the efficiency of parallel processing in a multi-processor system comprising a plurality of processors using a combination of control-flow type parallel processing control and data-flow type parallel processing control by combining a shared system (a shared resource such as a shared memory and a shared I/O which can be accessed freely among the processors) and a queuing processing among the processors, i.e. a synchronizing processing circuit which executes synchronizing processing among the processors, as disclosed in Japanese Patent Laid-Open No. Hei. 5-2568. This publication No. Hei. 5-2568 has disclosed the overall architecture and methods of processing in the multiprocessor system.

In accordance with the present invention, an accessing method for accessing shared memory more efficiently than the method disclosed in the above-mentioned publication, the structure for carrying out the accessing method and an optimum synchronizing processing method will be disclosed.

Figure 1:
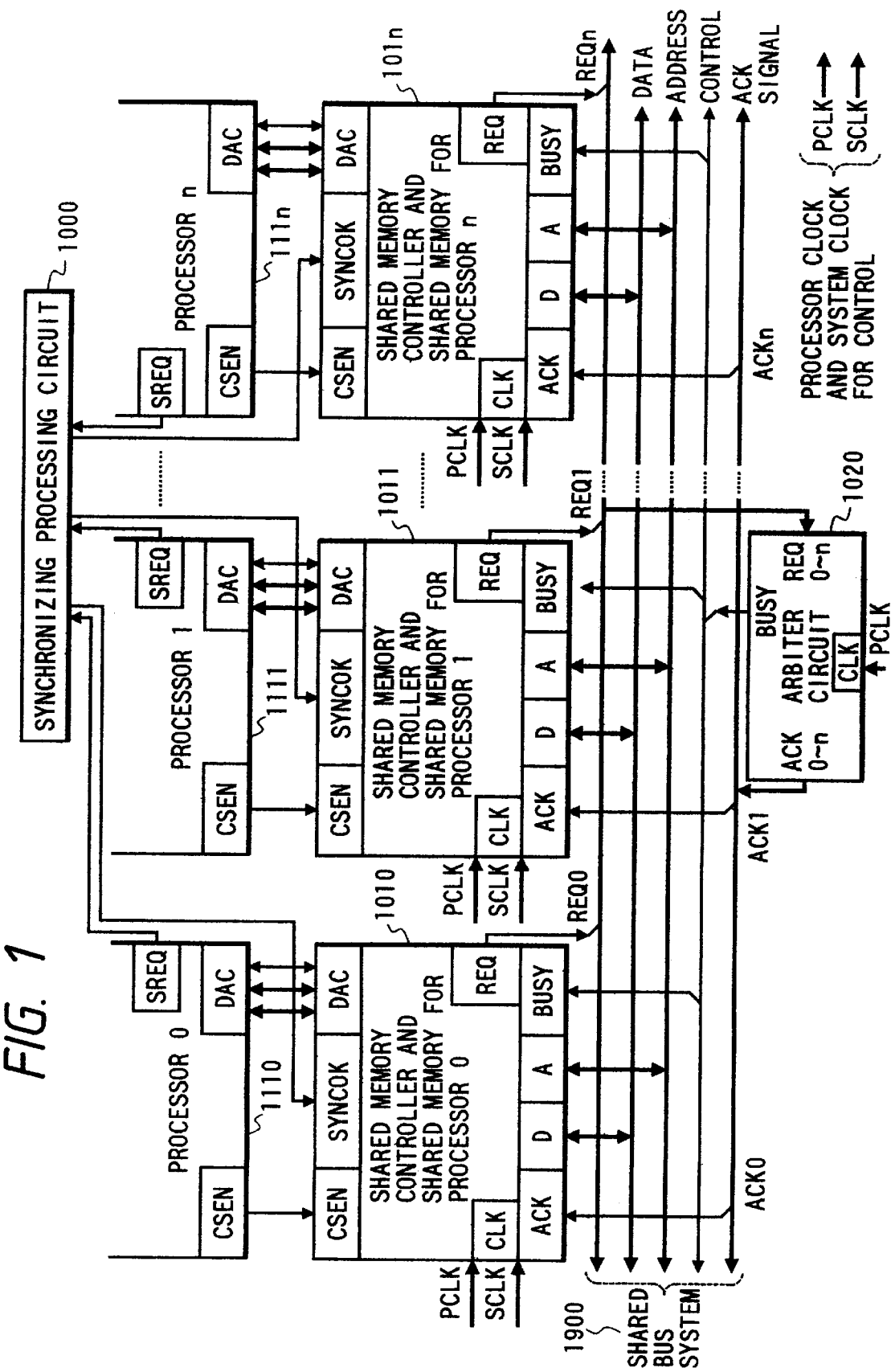
FIG. 1 is a schematic block diagram showing the architecture of a shared system according to the present invention.

At first, the structure shown in FIG. 1 and an inter-processor synchronizing processing method will be explained briefly. As a multi-processor system comprising a plurality of processors 0 through n (1110 through 111*n*) and a shared system which is a resource freely accessible from any one of them, the system shown in FIG. 1 is arranged such that each shared memory controller and shared memory are disposed in a body in correspondence to each processor so that each of the shared memory systems 1010, 1011, . . . 101*n* can be considered as being equivalent to a local memory of a respective processor, when seen from each processor, to carry out a broadcast type control by which, when one processor changes the contents of its shared memory within its shared memory system, shared memories within shared memory systems of other processors are changed accordingly.

Further, a synchronizing processing circuit 1000 for executing synchronizing processing among the plural processors and for controlling parallel processing of each task executed by each processor is provided to perform the parallel processing control in which the control flow and data flow are combined as disclosed in Japanese Patent Laid-Open No. Hei. 5-2568.

That is, when one processor ends one task, it issues a Synchronization Request (SREQ), representing a notification that the task has been finished, to the synchronizing processing circuit 1000. Then, the synchronizing processing circuit 1000 keeps Synchronization Completion Information (SYNCOK) inactive until another processor executing a task for which queuing processing (synchronizing processing) must be carried out ends its processing and issues a Synchronization Request (SREQ) to the synchronizing processing circuit 1000. And indeed, the processing for queuing the processor is executed when the processor accesses the shared memory. At this time, the synchronizing processing circuit 1000 withholds the access of the processor to the shared memory, when SYNCOK is not active, until when it turns active, and when it is active, it enables its access to the shared memory unconditionally.

It is noted that the SYNCOK signal of the present invention may be considered to have an almost equivalent function with the TEST signal in the Japanese Patent Laid-Open No. Hei. 5-2568.

In FIG. 1, the processors 0 through n are connected to the corresponding shared memory systems 1010 through 101*n* via data buses (D), address buses (A) and control buses (C), respectively. In the present embodiment, when an access of one processor to its corresponding shared memory system occurs, a Shared System Enable (CSEN) signal that is activated indicates a start of an access cycle to the shared memory system.

Although it is possible to generate a signal which corresponds to CSEN internally by decoding an Address signal A or the like within each of the shared memory systems 1010 through 101*n*, CSEN is provided directly from the processor as a signal independent of each of the signal groups of D, A and C in the present embodiment because the latency may be shortened even more by decoding and generating this signal in advance on the side of the processors 0 through n.

In FIG. 1, each of the shared memory systems 1010 through 101*n* is connected to a shared bus system 1900 which comprises signal lines which carry REQ, Data, Address, Control and ACK signals.

As has been described, the shared bus system 1900 is provided to allow one shared memory system of one processor, which has write-accessed its shared memory to change data therein, to broadcast to all other shared memory systems information for changing data existing at a corresponding address of each of the shared memories of the other processors as well.

That is, when a write cycle to a shared memory system occurs from some processor, its information is transmitted to the shared memory systems of the other processors via the shared bus system 1900 and the contents of necessary data at the corresponding address of each shared memory attached to each processor is changed.

In the shared bus system 1900, the REQ signal group is a collection of Bus Request signals (REQ) generated respectively from the shared memory controller in each of the shared memory systems 1010 through 101*n* in write-accessing to the shared memory. These are input to a bus arbiter circuit 1020. The bus arbiter circuit 1020 selects one of the received REQ signals, activates an Acknowledge signal ACKm which corresponds to REQm (Request signal corresponding to a processor m) and transmits it to an ACK input of the corresponding shared memory system via the ACK signal group.

When the ACK input is activated, the shared memory controller generates Data and an Address, which have become the objects of the write cycle, on the shared bus system 1900 and the bus arbiter circuit 1020 activates the Control signal (BUSY) indicating that information on those shared buses is active or that the buses are being used.

The BUSY signal is transmitted to a busy signal (BUSY) input of each of the shared memory systems 1010 through 101*n* via the control signal line (Control) within the shared bus system 1900 and each shared memory controller determines whether there exists data to be written to the shared memory on the shared bus by checking that information. If there exists data to be written to the shared memory (if the Busy signal is active), each shared memory controller writes the effective data to the specified address in its own shared memory simultaneously to keep the contents of the shared memory corresponding to each processor always the same in each shared memory.

It is noted that, although it is conceivable to adopt a method in which each shared memory controller, which has received an Acknowledge signal (ACK) from the arbiter circuit, outputs and transmits a Busy signal to other shared memory controllers, depending on the system, the method of the present embodiment may be more effective in a system requiring a quick operation, because such a method will require a longer time to output a Busy signal (delay of the signal is large) as compared to the present embodiment.

Beside that, Bus Command, Status Information, Bus Clock, Data Transfer Protocol control signals, Bus State and Bus Cycle control signals, various response signals from a resource, and interrupt vector and message information signals may be assigned as the control signal (Control) depending on the system.

Figure 2:
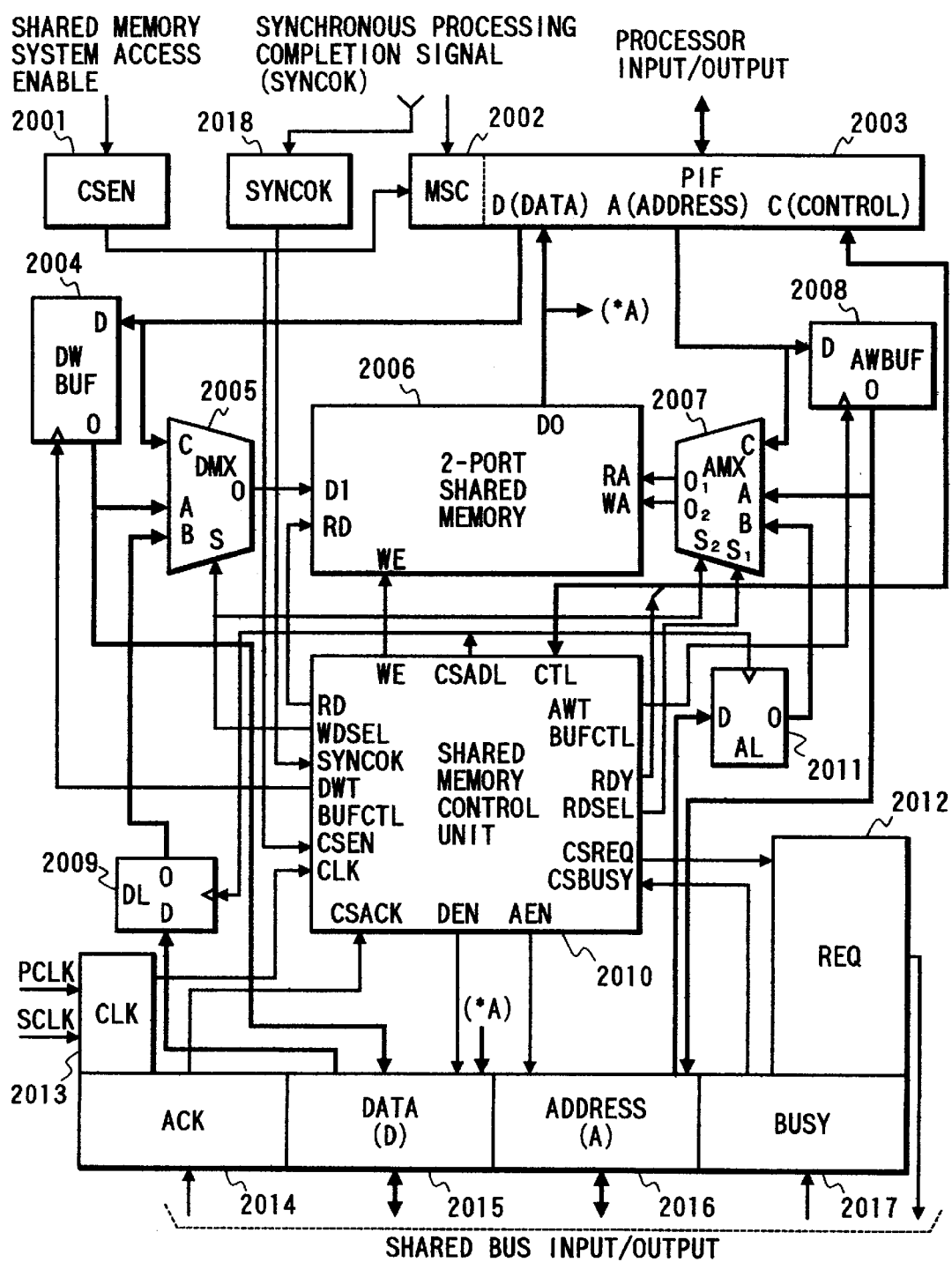
FIG. 2 is a schematic block diagram showing details within a shared memory system which corresponds to each processor.

FIG. 2 shows the structure of each of the shared memory systems 1010 through 101*n* of the present invention. Its most significant characteristic is that it adopts a two-port memory structure in which a shared memory 2006 is provided with an address for reading (RA), and its corresponding output data (DO), and an address for writing (WA), and its corresponding input data (DI), via separate ports.

The shared memory system comprises the two-port shared memory 2006, a shared memory control unit 2010, a processor interface (PIF) 2003 and a machine state controller (MSC) 2002, various input/output buffer units 2001 and 2012 through 2018, latch and buffer memory units 2004, 2008, 2009 and 2011, multiplexer units 2005 and 2007, and a clock generating circuit (CLK) 2013.

Each shared memory system operates in synchronism with basic clock signals, such as processor clock signal (PCLK) and system clock signal (SCLK). The PCLK signal is a clock signal synchronized with the bus cycle of the processor and it may be considered that the bus cycle of the processor operates on the basis of this clock signal. The SCLK signal is a clock signal which is the basis for timing of the whole system and it may be considered that the system is synchronized with this clock signal. It may be also considered that generating the PCLK signal based on the SCLK signal allows the most efficient timing control under the most ideal condition because the whole system including the processors is operated in synchronism with one basic clock signal (the SCLK at this time) as a result.

Features and basic operations of the shared memory system of the present invention will be explained in a) through f) below.

a) When an Access Enable signal (CSEN) to the shared memory system turns active, the shared memory control unit 2010, the PIF 2003 and MSC 2002 obtain that information via the signal input circuit 2001 and are informed that an access from the processor to the shared memory system has occurred.

Then, the PIF 2003 and the MSC 2002 exchange address and data information, which are to be accessed by the processor, with the processor at an adequate timing which conforms to the bus cycle and bus protocol of the processor.

In the present embodiment, a physical address area of the shared memory is decoded on the processor side so that the CSEN signal turns active when the processor accesses that area.

The MSC 2002 permits each processor system, including the shared memory system, to operate with a single reference clock and allows the whole system to operate as a synchronous large scale digital circuit system, while assuring a longer access time (during read cycle in particular) when the processor accesses the shared memory system.

b) When a bus cycle of the processor for accessing the shared memory is a read cycle, data is read out of the shared memory 2006 directly by utilizing read ports (DO and RA) of the shared memory 2006, except in a special case. At this time, the address multiplexer AMX 2007, which multiplexes various address information to provide to the shared memory 2006, obtains the address information from the processor at an input C via the PIF 2003 and provides it to the Read Address port RA of the shared memory 2006 from an output O1. Data corresponding to a value of the RA is read from the DO port of the shared memory 2006. The Read Data value is sent to the processor via the PIF 2003.

It is noted that an operation for controlling a selection input signal $S_1$ for deciding which one among A, B and C inputs on the input side of the multiplexer 2007 to be selected to apply to the output $O_1$ is carried out in the AMX 2007 by an RDSEL signal from the shared memory control unit 2010. At this time, a reading latch circuit may be provided within the PIF 2003 to latch the data from the shared memory 2006 to hold the data for the processor in a manner to maintain enough setup and hold times at least during a period before and after the timing when the processor reads the data.

Further, if the period wherein the data read out of the shared memory 2006 is effective satisfies the setup and hold times described above from the beginning, such as when a clock signal (bus clock signal etc.) defining the bus cycle of the processor is in synchronism with a clock signal defining the timing for writing data to the shared memory, the data may be provided directly to the processor.

c) When a bus cycle of the processor for accessing the shared memory is a write cycle, a Write Address sent from the processor via the PIF 2003 is written into the Address Write buffer AWBUF 2008 with an adequate timing in correspondence with an AWTBUFCTL signal of the shared memory control unit 2010 in the present embodiment.

The AWBUF 2008 may be arranged such that a plurality of Write Address information is stored in a time-series manner and the Write Address information is output in a FIFO manner to an A input of the AMX 2007. The AMX 2007 outputs a selected Write Address value from the address inputs A, B and C to O2 to the Write Address WA input of the shared memory 2006. A selection signal input S2 for that selection is controlled by a Write Data signal WDSEL of the shared memory control unit 2010.

Data to be written to the target Write Address WA is also stored in the Data Write buffer DWBUS 2004 from the processor via the PIF 2003 and is selected by the data multiplexer 2005 (input to A and output to O) and provided to a data input DI of the shared memory 2006.

The function of the DMX 2005 is almost the same as that of the AMX 2007. However, a selection signal input S for selecting one of the Write Address information input to inputs A, B and C, respectively, for output to O is controlled by a WDSEL signal of the shared memory control unit 2010.

While a function of the DWBUF 2004 is also almost the same as that of the AWBUF 2008, the DWTBUFCTL signal of the shared memory control unit 2010 is used as a control signal for latching and storing data from the processor in the DWBUF 2004. If the control timing of the DWBUF 2004 and the DMX 2005 is the same as that of the AWBUF 2008 and the AMX 2007 (if the output timing of the address value and data value from the processor is almost the same for example), the selection signal and latch signal may be controlled by using the same control signal.

It is noted that data is written to the shared memory 2006 under the control of the Write Enable WE signal from the shared memory control unit 2010. When the WE signal is activated, data input to the DI port of the shared memory 2006 is reflected on the contents of a memory cell which corresponds to an address value input to the RA port and the data is latched into the memory cell at a timing when the WE signal is returned to the inactive state in the present embodiment. If the contents of the RA and WA ports of the shared memory 2006 indicate the same address value, the same data as input to the DI port is output at the DO port when the WE signal is active.

Accordingly, it can be said that the timing for changing information in the shared memory is decided by the timing of activating the WE port in the case of the present embodiment.

During the write cycle, it is necessary for a processor to change the contents of not only its own shared memory, but also of the shared memories corresponding to other processors by broadcasting the same data and address information to each shared memory. Accordingly, write information output means for outputting Write Data from the O output of the DWBUF 2004 and a Write Address output from the O output of the AWBUF 2008 to the shared bus system via the data buffer 2015 and the address buffer 2016 is provided.

ON/OFF control of the data buffer 2015 and the address buffer 2016 with respect to the shared bus system is effected by a DEN signal and an AEN signal, respectively.

d) When another processor changes the contents of its shared memory, address information sent via the shared bus system is taken in through the address buffer 2016 and data information is taken in via the data buffer 2015, respectively, and the data information which corresponds to the address information is written to the shared memory 2006.

In the present embodiment, the information obtained via the data buffer 2015 is held for a time in the data latch 2009 and the information obtained via the address buffer 2016 is held for a time in the address latch 2011. Then, the data information is input to a B input of the DMX 2005 and the address information is input to a B input of the AMX 2007, respectively. Thus, the data to be written is input from the O output of the DMX 2005 to the DI input of the shared memory 2006 and the address thereof is input from the Oz output of the AMX 2007 to the WA input of the shared memory 2006.

The timing for latching information in the data latch DL 2009 and the address latch AL 2011 is controlled by a CSADL signal of the shared memory control unit 2010. The CSADL signal controls the timing such that the data and address information defined on the shared bus system are latched to the DL 2009 and the AL 2011 while assuring sufficient setup and hold times.

In the present embodiment, when the CSADL signal turns active, the latch circuit is set up by outputting the information received at the D input of the DL 2009 and the AL 2011 to the output O thereof and the information is latched by the DL and the AL at a timing when the CSADL returns inactive. In the present embodiment, because each shared memory system of each processor operates completely in synchronism corresponding to the basic clock signals (PCLK and SCLK) having the same phase, it may be considered that the timing for inputting/outputting necessary information from/to the shared bus system by controlling the data buffer 2015 and the address buffer 2016 during the write operation and the timing for latching the necessary information to the DL 2009 and the AL 2011 generated in synchronism with that timing are defined within the shared memory control unit 2010 in each shared memory system.

This synchronization allows the shared memory control unit 2010 to perform an effective timing control having less overhead and latency in generating the control signals, such as the signals CSADL, DEN, AEN, AWTBUFCTL and DWTBUFCTL for stipulating the required timing. The WDSEL signal for controlling the DMX 2005 and the AMX 2007 and the WE signal for writing data to the shared memory 2006 may be generated within the shared memory control unit 2010 in correspondence to the control timing of the CSADL signal, which defines data in the DL 2009 and the AL 2011.

e) An arbitration control for assigning a right to use the shared bus system reliably to one processor among the shared memory systems of the respective processors is necessary.

Assuming that a write cycle to the shared memory system by a processor has occurred from the control system C from the processor and that the shared memory system Access Enable signal CSEN is active, the shared memory control unit 2010 activates the CSREQ signal to generate a Request signal REQ to the bus arbiter circuit 1020 via the output buffer 2012.

Then, when a corresponding Acknowledge signal ACK from the bus arbiter circuit 1020 turns active and is input to a CSACK input of the shared memory control unit 2010 via the input buffer 2014, the shared memory control unit 2010 generates the write cycle to the shared memory and the shared bus system with the procedure described in c) assuming that the processor has obtained the right to use the shared bus system.

If the data buffer DWBUF 2004 and the address buffer AWBUF 2008 are full at this time, the shared memory control unit 2010 queues the processor by suspending the completion of the bus cycle of the processor. The shared memory control unit 2010 generates a RDY signal as a signal for deciding whether to queue the processor by suspending the completion of the bus cycle of the processor or to advance to the next processing by ending the bus cycle as scheduled.

When the processor is generating a bus cycle for accessing the shared memory system, and when the RDY signal from the shared memory control unit 2010 turns active, the bus cycle is ended as scheduled without queuing it, thereby to advance the processor to the next process. When the RDY signal is kept inactive, the bus vale is extended, executing an operation of queuing the processor as a result.

Basically, when the buffers DWBUF 2004 and AWBUF 2008 are not full and have sufficient space, the processor latches necessary data and address information into the buffers 2004 and 2008 and advances to the next processing without being queued. That is, when the processor executes a write operation to the shared memory and when a state in which the right to use the shared bus system is not obtained from the bus arbiter circuit 1020 as described above continues, the data and address information of write cycles pending within the buffers 2004 and 2008 are stored in a time-series manner and a write cycle issued in a state when the buffers have become full is extended until a space is created in the buffers, thus queuing the processor as a result.

When the buffers 2004 and 2008 are completely empty at the time of writing to the shared memory, and when the Acknowledge signal (CSACK) from the bus arbiter circuit 1020 turns active immediately corresponding to that write operation and the right to use the shared bus system is acknowledged, the writing processing may be executed by providing a Write Address (WA) and Write Data (DI) from the PIF 2003 directly to the shared memory 2006 via the C input of the multiplexers 2005 and 2007 in order to shorten the latency of the processing for writing to the shared memory.

This control is performed by the shared memory control unit 2010 using the WDSEL and WE signals. It is noted that when effective information exists in these buffers 2004 and 2008, the CSEN signal is kept active within the shared memory control unit 2010.

Meanwhile, when the ACK signal is inactive, even though the REQ signal is activated and the BUSY signal obtained from the bus arbiter circuit 1020 via the input buffer 2017 is active (connected to the CSBUSY input of the shared memory control unit 2010), the shared memory control unit 2010 considers that a write cycle to the shared memory and the shared bus system made by another processor is enabled and is being executed and generates a write cycle to the shared memory 2006 based on information broadcasted from the other processor via the shared bus system by the method described in d).

f) In a case when the synchronizing processing circuit 1000 and the shared memory systems 1010 through 101n operate in linkage, the processor activates the Synchronization Request signal SREQ to request the synchronizing processing circuit 1000 to perform synchronizing processing before hand after finishing a necessary task processing in order not to cause any contradiction during an exchange of data among other processors by performing a local synchronizing processing between the processor within the shared memory system when it accesses the shared memory system (when read access in particular) as it requires data on the shared memory (data and the like from other processors exist) in the later timing.

If there is even one inactive SREQ signal from a group of processors to be synchronized, as defined in advance, i.e. from the processors belonging to the group of processors whose processing is run in concert, among Synchronization Request signals SREQ from each of the processors 1110 through 111n, the synchronizing processing circuit 1000 informs the processor to be responded to that a necessary synchronizing processing has not finished yet by keeping the Synchronizing Processing Completion signal SYNCOK inactive until all the SREQ signals turn active.

The shared memory system of the processor monitors the synchronization information from the synchronizing processing circuit 1000 by receiving the SYNCOK signal via the signal input circuit 2018. When SYNCOK is inactive at least and the processor generates an access cycle (read cycle in particular) to its shared memory system, the shared memory control unit 2010 executes a local synchronizing processing operation between the processor and the shared memory system by queuing the processor by suspending the completion of the bus cycle of the processor by keeping the RDY signal inactive.

Thereby, the processor is controlled so as not to obtain erroneous information and to generate erroneous processing results by accessing the shared memory which is in a state when no necessary information from other processors which perform processing in concert therewith has been written to the shared memory 2006.

The present embodiment is characterized in that it has the buffer systems DWBUF 2004 and AWBUF 2008 to make it possible to store access information in those buffer systems in a time-series manner and to post-process it within the shared memory system independently from and in parallel with the operation of the processor, even if the operation of the processor precedes the processing of an access cycle to the shared memory system.

As a result, it allows the processing of the processor to be advanced further without queuing it more times than necessary. At this time, there is a possibility that a state exists in which effective data resides in the buffer systems 2004 and 2008 within the shared memory system of each processor, even if the SYNCOK is active, i.e. a state in which the data which should be present in the shared memory from the beginning, if the synchronizing processing has been completed, does not exist in the shared memory yet.

When a free read operation from the read ports (RA and DI of the shared memory 2006) which can be executed in parallel with the write cycle to the shared memory as described in b) is executed in this state, no necessary data may be obtained, thus leading to an erroneous processing.

Accordingly, a function is provided within the shared memory control unit 2010 to inhibit a read cycle of the processor to the shared memory until the BUSY signal becomes inactive, if the BUSY signal is active, even if the SYNCOK signal turns active, by utilizing the fact that the write cycles occur continuously on the shared bus system and the BUSY signal from the bus arbiter circuit 1020 is kept active when the effective data exists within the buffer systems 2004 and 2008 of the shared memory system corresponding to any one processor.

That is, when the read cycle from the processor occurs in this state, the shared memory control unit 2010 keeps the RDY signal inactive until the BUSY signal becomes inactive to delay its bus cycle and to queue the processor.

The basic functions of the inventive shared memory system described in a) through f) are clearly different from the prior art system in the following two points.

1) A two-port (read port and write port) memory unit, which can be controlled independently and in parallel, is used for the shared memory 2006 within the shared memory system. Thereby, read and write cycles to the shared memory may be executed in parallel, thus making it possible to shorten the latency for the processing for conforming data among the shared memories and the processing for transferring data among the processors and to reduce the loss caused by access contention among the processors remarkably. As a result, the total throughput for the shared memory system may be improved.

2) There is provided a local synchronizing interlock circuit for queuing the read cycle of the processor for a period from a time when a notification of completion of synchronization is issued by the synchronizing processing circuit until a time when information on the shared memory is actually rewritten to an effective state with respect to its purpose in order to guarantee that information generated by a target task among tasks controlled by the synchronizing processing is exchanged reliably via the shared memory when the interprocessor synchronizing processing circuit 1000 and the shared memory system are operated in linkage. Thereby, the synchronizing processing among the processors may be performed reliably without any contradiction, guaranteeing also an adequacy of passing of data among the tasks, and making it possible to control the processing automatically so that the processor will not perform erroneous processing by obtaining old information.

Next, the functions of the two-port shared memory 2006 and the peripheral circuits related to its control within the shared memory systems 1010, 1011, . . . 101n of each processor will be explained in detail by using a simplified embodiment shown in FIG. 3. Here the functions and effects brought about by providing the two ports will be explained specifically.

Figure 3:
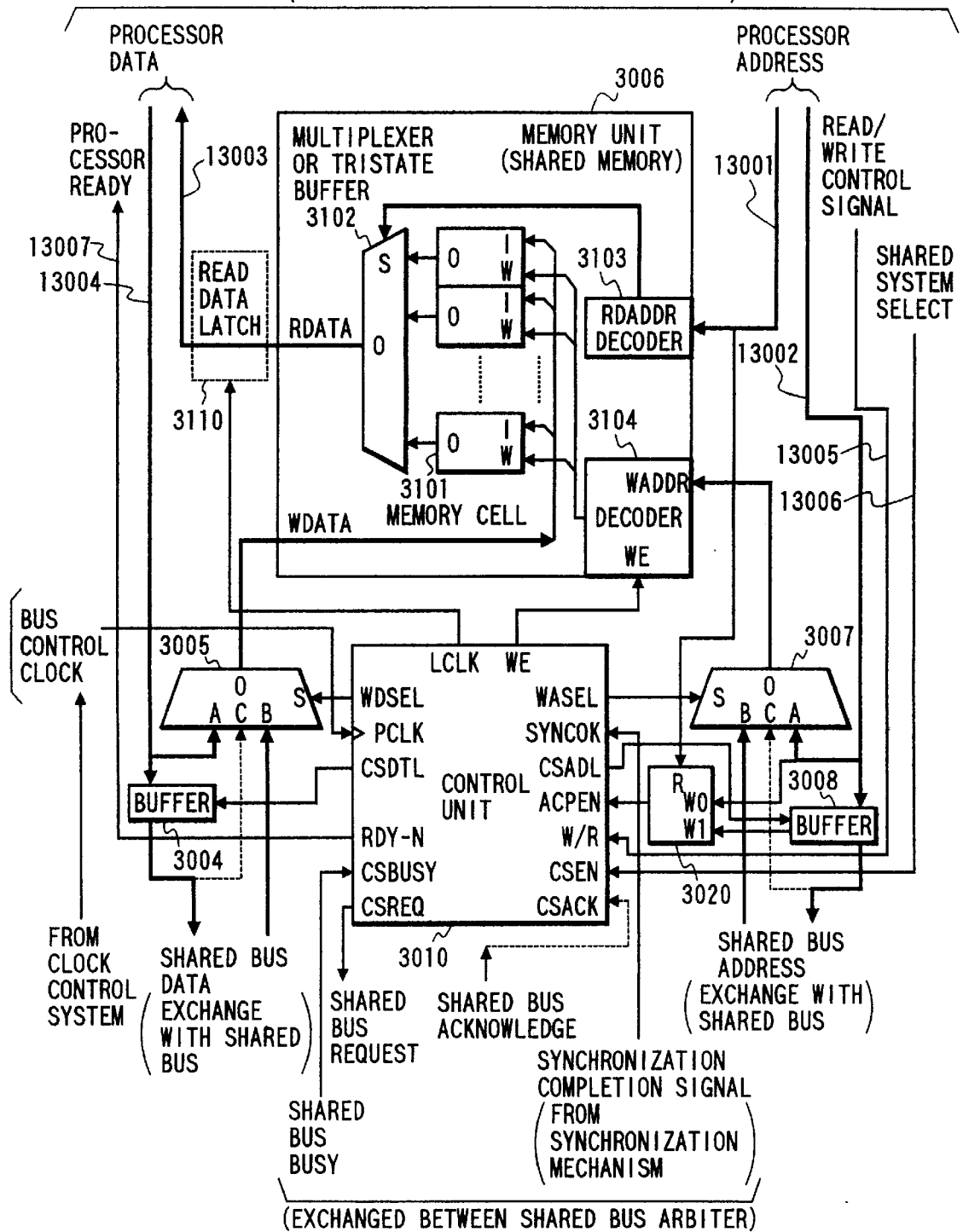
FIG. 3 is a schematic block diagram showing a memory unit and a control unit of the present invention.

The functions of components denoted by 3004, 3005, 3006, 3007 and 3008 shown in FIG. 3 correspond to those functions of the components 2004, 2005, 2006, 2007 and 2008 in FIG. 2. While there is a case wherein a read data latch 3110 exists, its function is assumed to exist within the PIF 2003 in FIG. 2 as described before. While the inside of a memory unit 3006 is disclosed in detail in FIG. 3, its peripheral functions are represented simply to simplify the explanation.

At the time of processing for reading data by the processor, Read Address 13001 from the processor is input directly to a Read Address decoder 3103 of the memory unit 3006 and an output corresponding to an address specified from a group of memory cells 3101 is selected by a multiplexer 3102 by switching a selection input S of the multiplexer 3102 in response to an output from the decoder 3103 to output data to the processor as RDATA 13003. The multiplexer 3102 may be constructed by combining a tristate buffer, as shown also in FIG. 4.

At the time of processing for writing data by the processor to the shared memory, a Write Address 13002 is output to the shared memory via the buffer 3008 to generate address information of the shared bus system and is input directly to a WADDR decoder 3104 of the memory unit 3006 of the processor via the multiplexer 3007. The buffer may be constructed as a queue system for storing the address data in a time-series manner to provide the same FIFO function as the buffer 2008 in FIG. 2.

The Write Address input directly to the memory unit 3006 is decoded by the WADDR decoder 3104 to decide to which memory cell in the group of memory cells 3101 the data should be written. Then, in response to the Write signal We, the contents of data WDATA to be written to the selected memory cell is latched. The WE signal is generated in a control unit 3010 in response to signals such as write/read control signals W/R 13005 and shared system select signal CSEN 13006. The Write Data 13004 from the processor is input to the memory unit 3006 as WDATA via the multiplexer 3005.

As with the Write Address 13002, Write Data 13004 is output to the shared system via the buffer 3004 having the same function as the buffer 3008. The Write Address and Write Data output to the shared system are broadcasted to shared memory systems of the other processors via the shared system and Write Data is latched in a memory cell of a corresponding memory unit.

In the present embodiment, the paths of the data and address information, when the processor writes data to its own memory unit 3006, are connected to the memory unit 3006 directly after inputting the information to the multiplexers 3005 and 3007 (A inputs of the multiplexers) just before the buffers 3004 and 3008. When such paths are used only as writing paths to the memory unit 3006, the control method and conditions differ more or less from the paths using the signals which have passed the buffers 3004 and 3008 as explained in FIG. 2.

However, it has been described before that they are designed to become paths which are the same as those in FIG. 3 if the C inputs of the DMX 2005 and the AMX 2007 are selected also in FIG. 2.

The merit of this direct input method is that while the processor may change data in its own memory unit (shared memory) with a faster timing than that of the memory units of the other processors, when the processor rewrites the contents of the shared memory, it becomes easy to prevent the past data from being read due to a latency involved in changing the shared memory in a case when the processor reads the contents of the shared memory which it has changed again right after a change, for example, such as in flag control, semaphore control and in holding shared data which it uses itself.

However, the writing may be controlled readily by using only these direct paths when the buffers 3004 and 3008 are one stage or so, to recover the overhead required selected for write processing of the other processors to the shared memory, and are used for temporarily storing data to advance the bus cycle of the processor further. When the buffers having such a function are provided, the control unit 3010 must operate so as to write data to the memory unit 3006 immediately after confirming an acknowledge signal from the arbiter circuit.

It is also preferable to provide a latch function for holding the Write Address 13002 and the Write Data 13004 until the data is written to the memory unit 3006 within the PIF 2003 in FIG. 2. An allotment of functions may become clear by providing such a buffering function within the PIF 2003 in FIG. 2 by considering it as a part of the function of the PIF. It is because ON/OFF control of the latch function of the buffers may be provided by the Acknowledge CSACK signal of the shared bus system, and this can be accomplished by inputting the CSACK signal to the PIF 2003, and not controlling it purposely using the control unit 3010.

It may be more rational to provide paths (C inputs) which pass through buffers to the multiplexers 3005 and 3007, similar to FIG. 2, and to switch and control them when full-scale buffers are to be provided.

When each processor reads data again and uses contents of data which it has changed with its own processing program, it is important to guarantee the consistency in the data automatically by hardware so as to be able to process the data while maintaining the consistency without having any contradiction. It is because most processors process programs which are, individually, supposed to be described and executed sequentially, and there is a relationship often in the context of the data writing and data reading operations with respect to a resource.

When one processor reads data which has been changed by another processor, on the other hand, and when the difference of time between when the other processor has changed the data and when the processor actually reads the data (latency of information) poses no problem or when the quantity of state dependent on a time t having a continuity (position, speed, acceleration, etc.) is controlled by taking the sampling time in units of a minimum time, for example, it may be considered that there would be no problem even if the times of change of the information on the shared memory seen from each processor vary or are delayed more or less, if the quantity of state can be handled by assuming that the latency of the information described above is fairly small, as compared to the sampling time, or if the sampling time is set fairly large with respect to the latency of the information.

However, if the sampling time is set small so that the latency of the information becomes significant, errors in the processing parameters become large, thus causing a problem. Accordingly, a hardware architecture which improves the latency of the information, when an application whose sampling time is small, and to which a real-time performance is required is to be provided.

A processor system having enough real-time performance (real-time process ability) means a system in which latency (communication delay among processors or between an outside system and the processor, a delay attaching to arithmetic processing time, etc.) which occurs in various places in the system is suppressed to a fairly small value with respect to a target sampling time in principle and this performance is regarded as the most important point in controlling a processor system.

In a real-time processor system having such a characteristic, most of the information of the quantity of state requires no synchronization among the processors for data communications due to a hand-shaking processing and the like and enough accuracy may be assured for processing results in transmission of information in which no synchronization is controlled specifically. When it is necessary to pass data reliably among the processors, this may be carried out by controlling information on the shared memory system combined with the synchronizing processing circuit 1000 as described above.

As a circuit for guaranteeing that the processor will be able to read/write the contents of the memory unit 3006 without contradicting a flow of processing of its own program, an address comparison circuit 3020 is provided in the present embodiment. It takes in the Write Address 13002 from the processor and the Write Address stored in the buffer 3008 at W0 and W1 inputs, respectively, and takes in a Read Address 13001 from the processor to an R input. Then, the contents of the Write Addresses W0 and W1 and the Read Address R are compared during a read cycle from the processor to the memory unit 3006. If there is even one comparison which agrees, the control unit 3010 keeps the RDY-N signal output to 13007 inactive until all the write cycles to those Write Addresses in the shared memory finish to hold the read cycle of the processor and to cause the processor to wait.

In FIG. 3, the operation during the write cycle from another processor to the shared memory is the same as that of FIG. 2. That is, the control unit 3010 controls the selection signal input S by using the WDSEL signal output and WASEL signal output, respectively, so that the B inputs are selected respectively in the multiplexers 3005 and 3007. The control unit 3010 also controls the buffers 3004 and 3008 by using the CSDTL signal output and the CSADL output, respectively.

The empty state of the buffers 3004 and 3008 is controlled by providing a circuit for holding data indicating how much space is available in the buffers by counting the increase/decrease of available space within the control unit 3010. It is of course possible to apply this function to the buffer and to take in information therefrom to the control unit 3010. The functions of the other input/output signals of the control unit 3010 may be considered to be equal to the corresponding input/output signals of the shared memory control unit 2010 in FIG. 2.

Figure 4:
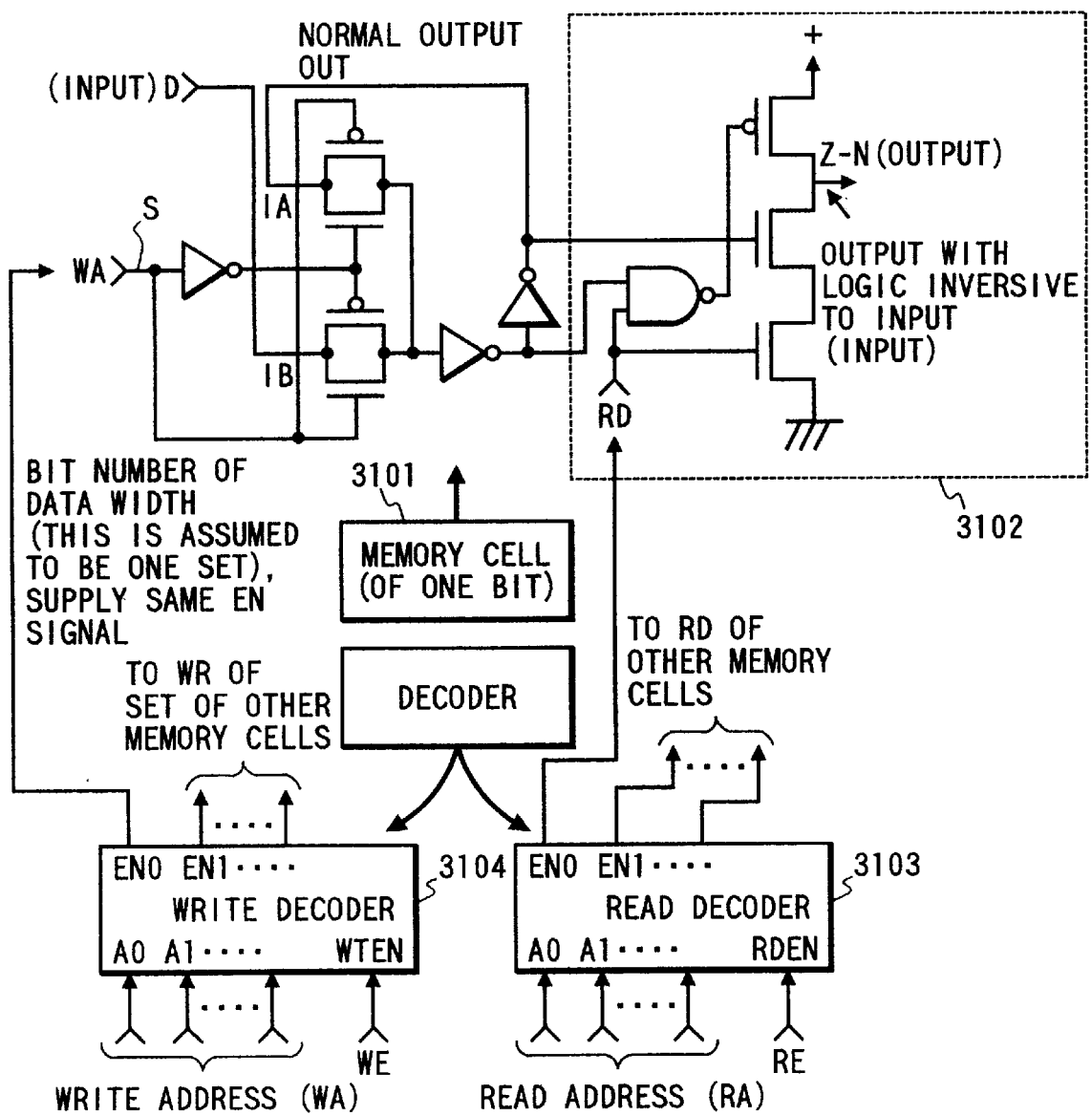
FIG. 4 is a schematic block diagram showing in detail a memory cell and decoder within the memory unit of the present invention.

FIG. 4 shows an embodiment relating to the decoders 3103 and 3104 and the memory cells 3101 within the memory unit 3006. The figure shows one of the memory cell groups within the memory unit 3006.

The memory unit is constructed by preparing a data bit number of memory cells 3101, by preparing a plurality of sets thereof and by providing a Read Address specifying means and Write Address specifying means so as to be able to specify memory cells independently by address values (WA, RA). Then, data is read by using data output means or data is written by using data input means with respect to the memory cell specified by the read address specifying means and the Write Address specifying means. Those means and their functions will be explained hereinbelow.

The multiplexer section 3102 may prepare a necessary data bit number of tristate buffers corresponding to each of the plurality of memory cells and provide a plurality of numbers of sets thereof which can be represented by address values. It is noted that each output (A–N) which corresponds the same data bit in each set is connected to each other. Any one of the plurality of sets of data may be selected by specifying a read address value RA.

The read decoder 3103 obtains the Read Address RA and the read enable RE as necessary and activates one among the enable signals (EN0, EN1, . . . ) which corresponds to the read address value.

Receiving the enable signal (active in 1 level), the read data input (RD) of each tristate buffer section 3102 outputs the contents of the memory cell 3101 to the Z-N (OUTPUT) if the signal is active, and if it is inactive, keeps the Z output in a floating state. When the RD input is 1, the tristate type multiplexer section 3102 inverts the contents of the memory cell (which is the value of the D input stored with a trigger signal of WR) and outputs it to the Z output, and when the RD input is 0, it keeps the Z-N output in the floating state as described above.

The Read Enable RE signal (active in 1 level) has a role of activating an enable output right after the Read Address is defined and when decoding itself is completed so that no hazard is placed on the enable signal. While a state in which ones among the connected tristate outputs Z short-circuit temporarily, if the hazard is large and connected with a skew and the like, there is no trouble specifically even if the RE signal is eliminated, if the hazard is small.

No Read Enable RE signal is provided specifically in the embodiments shown in FIGS. 2 and 3. If part of the multiplexer 3102 adopts a complete multiplexer structure, it is possible to use a value of the Read Address RA itself or a signal equivalent to that may be used directly for the selection input S.

As with the read decoder 3103, the write decoder 3104 generates an active Write signal WR (active in 1 level) in a set of memory cells which corresponds to one Enable signal EN indicated by the Write Address WA. The Enable signal EN is composed of EN0, EN1, . . . signals and each Enable signal is connected to a Write signal WR input of each of those sets corresponding to the set of each memory cell.

The write decoder 3104 provides the WR signal to the set of the target memory cell reliably only with an adequate pulse width for writing data to the memory cell by masking the Enable signal, except for a period when the WE signal (active in 1 level) is active so that no hazard is generated on the Enable signal (active in 1 level) which is output when the specified Write Address WA is defined and the decoding is completed, by using the Write Enable WE signal.

The structure of the memory cell 3101 shown in FIG. 4 is when a CMOS process is used and a gate latch is configured by using a transfer gate (or called also as a transparent type gate) type two-input and one-output multiplexer and by feeding back a normal output OUT to one input IA of the transfer gate, providing data (D) to the other input IB and providing a WR signal as a selection signal (base input signal of the transistor) S.

That is, when WR is at the 1 level, the value of the D input is transmitted and the value is latched at a leading edge of WR. The value of the D input stored with a trigger signal of WR is inverted and output to the Z-N output of the tristate buffer 3102 during reading.

Figure 5:
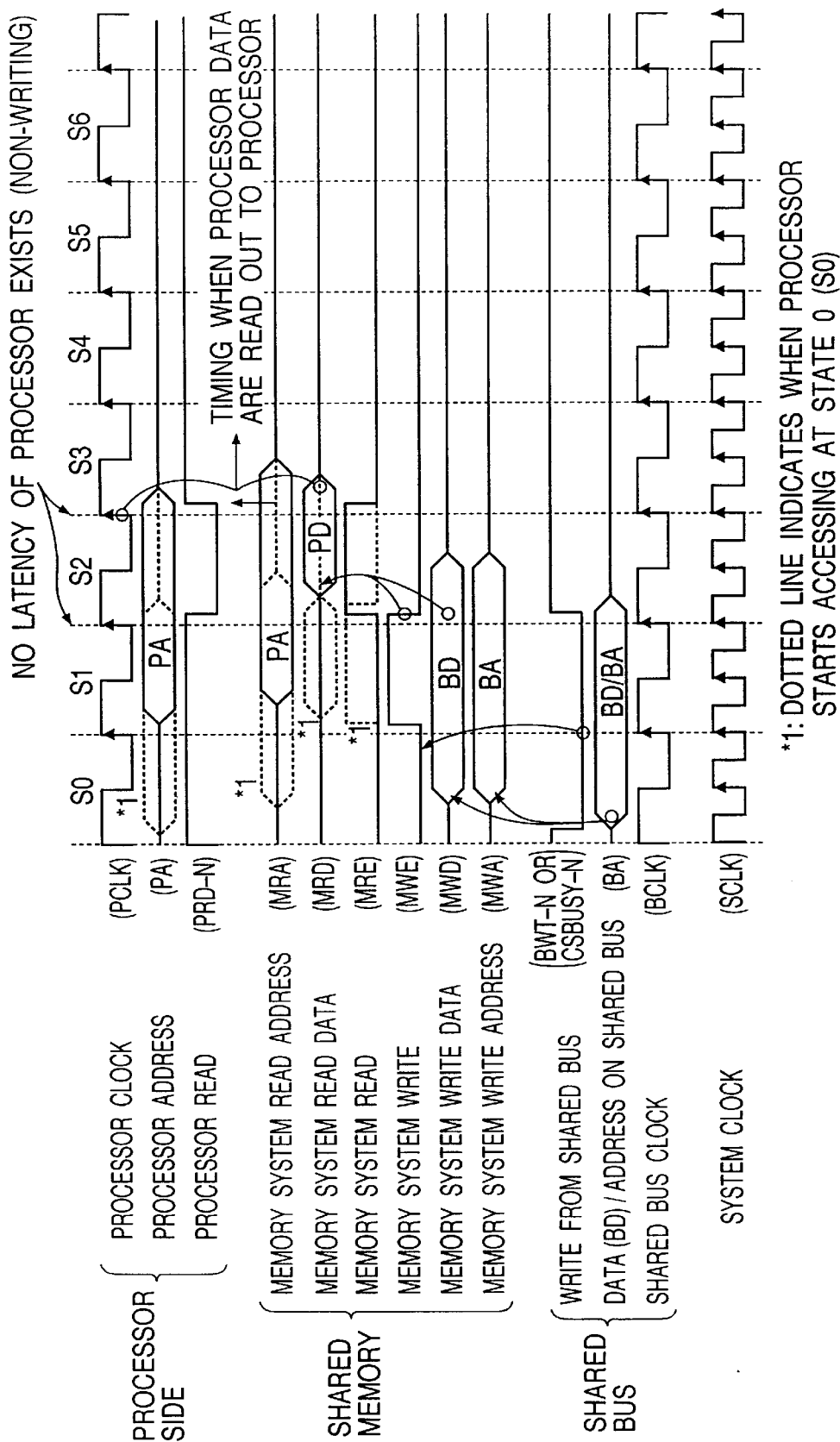
FIG. 5 is a timing chart showing control of access to the shared memory when PCLK is synchronized with BCLK and a two-port shared memory is used according to the present invention.

FIG. 5 shows timings of the accesses to the inventive shared memory. The processor clock signal (PCLK) which is the basis of the bus protocol on the processor side and the shared bus clock signal (BCLK) which is the basis of the bus protocol on the shared bus side are rendered to have the same frequency and same phase and are both generated in synchronism with the system clock signal (SCLK). It is noted that the frequency of the SCLK signal is equivalent to double the period of the PCLK and BCLK signals. The broadcast type shared memory system is presumed here and the two-port memory unit having both read and write ports independently, which is the feature of the present invention, is used in the shared memory section of each shared memory system corresponding to each processor, as described before.

FIG. 5 shows a state of contention of an access from the shared bus side (some processor generates a write cycle to the shared memory system and its information is broadcasted via the shared bus system) with a read cycle to the shared memory from the processor side. The status of the bus signals on the write port side of the shared memory are represented by Memory Write Data (MWD), a Memory Write Address (MWA) and a Memory Write Enable (MWE), and the status of the bus signals on the read port side are represented by Memory Read Data (MRD), a Memory Read Address (MRA) and a Memory Read Enable (MRE).

The bus cycle on the processor side is two processor clock signals (2×PCLK), and an access cycle, which is required on the shared memory, is also substantially a period of 2×PCLK. However an access time to an actual shared memory is about a period of 1.5×PCLK and the remaining period of 0.5×PCLK is assumed to be a time necessary for a data hold time, a timing adjusting time or a setup time for the processor.

In FIG. 5, the processor starts the read cycle to the shared memory in synchronism with the PCLK signal at the head of State S1 to generate a processor address (PA) and generates a processor read command signal (PRO-N) which commands to read target data in State S2. Meanwhile, the shared bus side generates a shared bus address (BA), Busy signal (CSBUSY-N), or a shared bus write signal (BWT-N) indicating that the write cycle from the shared bus side has become active, and shared bus data (BD) which is to be written to the shared memory in synchronism with the BCLK at the head of State S0.

In accordance with the present invention, BD and BA are output to the shared bus system from the shared memory system 101*n* of the other processor almost in the same timing, and CSBUSY-N (active in 0 level) is generated by a BUSY signal from the bus arbiter circuit 1020 and is output with a timing slightly preceding that of BD and BA. It is noted that CSBUSY-N is a signal indicating that the shared bus is being used and is one of the control signals of the shared bus system, as explained with reference to FIG. 2.

Because of the two-port shared memory, the read cycle on the processor side to the shared memory finishes at the end of State S2 without being queued. If the processor specifies an address on the shared memory which is the same as BA from the shared bus side by the PA at this time, BD is read to the processor side as it is on the data processor side to be read by the processor in response to a timing of the RDY-N signal at the final point of S2 (read period from the shared memory is a period when RE is active).

The write cycle from the shared bus system side is started, preceding by one PCLK period the read cycle of the processor side, also on the shared memory, i.e. without being queued within State S0. The write command (WE) on the shared memory is generated in State S1 and BD which corresponds to BA is defined already in State S1. It is noted that when WE is in the 1 level state, BD is transmitted to an address which corresponds to BA on the shared memory and is latched to that address at the trailing edge of WE in the present embodiment.

Accordingly, when the processor reads data at the address which corresponds to BA after State S1, it can read BD, as described before. When the processor starts the access at the head of the State S0, as indicated by a dotted line in FIG. 5, for example, while the write cycle from the shared bus side overlaps with the read cycle from the processor side completely in the same timing, i.e. RE and WE are output in the same timing, both cycles are processed in parallel without being queued, thus finishing the processing in the shortest time.

As described above, the use of the present invention allows the bus cycle on the shared bus side and that on the processor side of the shared memory to be processed completely in parallel, and inter-processor data communication whose latency is very short is realized in the shared memory.

As can be seen from the above description, the present invention using a two-port shared memory provides an effect of improving the throughput on the processor side and an effect of reducing the latency of data communications among processors via the shared memory considerably. It is noted that several contradictions regarding exchange of data among the processors may be avoided by performing an interlock or local synchronizing processing of the bus cycle on the processor side and that of the shared bus as explained with reference to FIGS. 2 and 3, or by having the inter-processor parallel processor control interlocked with the inter processor synchronizing processing circuit, as shown in FIG. 1.

Figure 6:
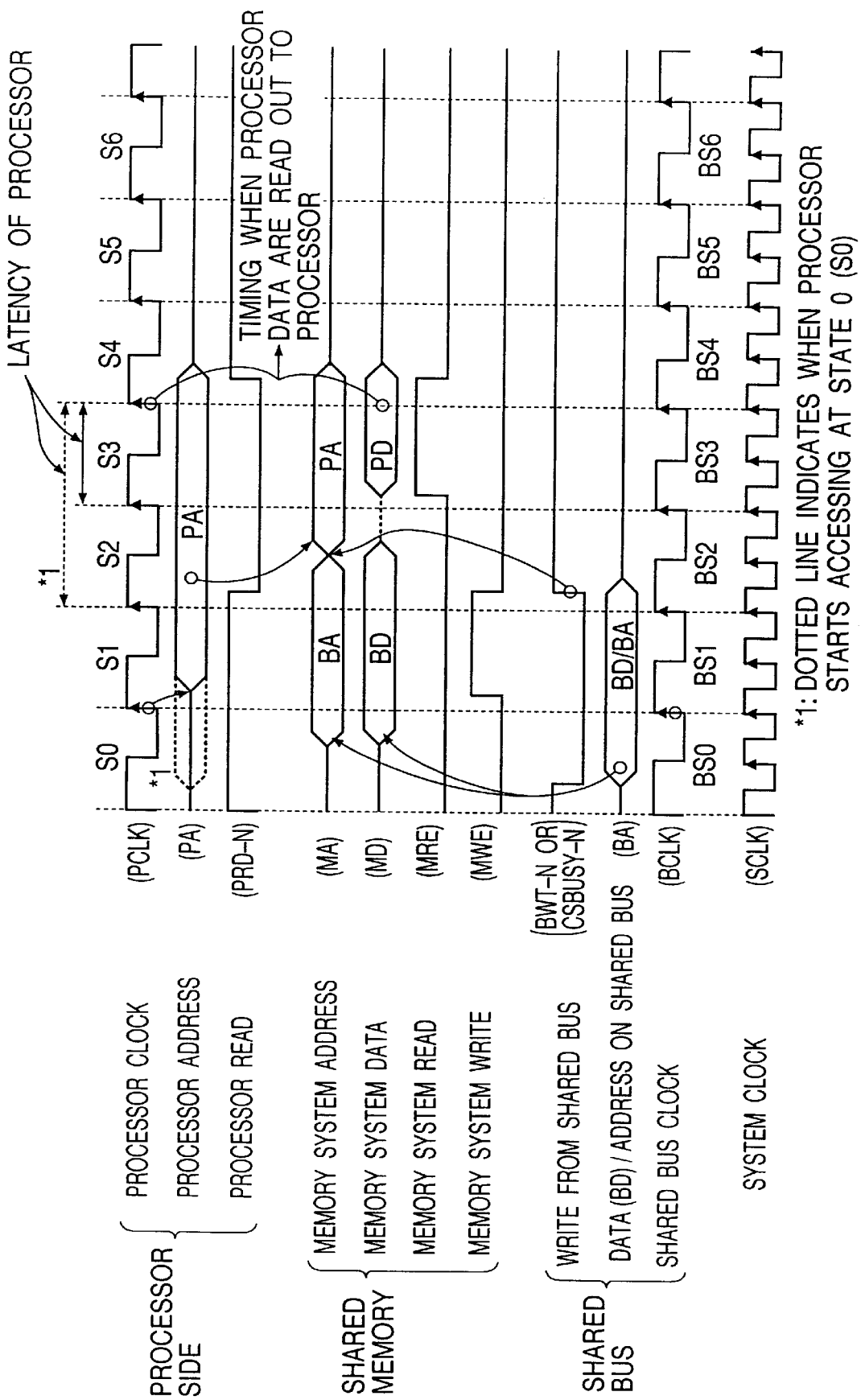
FIG. 6 is a timing chart showing control of access to the shared memory when PCLK is synchronized with BCLK according to the present invention.

FIG. 6 shows a timing chart of another arrangement in which a two-port shared memory is not used, as called for by the present invention, though PCLK and BCLK are both synchronized with SCLK and are the same as in the embodiment shown in FIG. 5. Accessing conditions on the processor side and the shared bus side are totally the same with those in FIG. 5. The broadcast type shared memory system disclosed in Japanese Patent Laid-Open No. Hei. 52568 is the type of system employed in this arrangement.

As it is apparent from FIG. 6, because only one set of address (MA) and data (MD) of the shared memory exists, address BA and data BD on the shared bus side become active with respect to the shared memory around the middle of State S0 at first and dominate the shared memory up to around the middle of State S2. A Write Enable WE is output at a similar timing to that in FIG. 5 and BD is latched in the shared memory at the head of State S2.

In the arrangement of FIG. 6, an arbitration control giving priority to the write operation from the shared bus side over the read operation from the processor side is performed basically. Therefore, when the write bus cycle on the shared bus side contends with the read bus cycle on the processor side, the bus cycle on the processor side is queued until the bus cycle on the shared bus side finishes. In the example shown in FIG. 6, the bus cycle on the processor side, which attempts read access to the shared memory, is queued by one State (period of PCLK) and it is completed after obtaining data on the processor side in the shared memory at the end of State S3.

When seen on the shared memory side, the write cycle on the shared bus side is executed for two cycles from around the middle of State S0 to around the middle of State S2 (BA, BD, MWE are active), and immediately after that, the read cycle on the processor side is executed (PA, processor side, MRE are active).

During a period when CSBUSY-N is active, the shared memory control unit assigns the bus cycle on the shared bus side to the corresponding shared memory and switches to the bus cycle on the processor side corresponding to a timing when CSBUSY-N becomes inactive (Hi level). It is noted that the bus cycle on the processor side is started at State S0, as indicated by a dotted line, and the latency of the bus cycle on the processor side increases to two States (a period of 2×PCLK), thus increasing the access overhead on the processor side.

It can be seen from the above description and from a comparison with the example in FIG. 5 that the access overhead on the processor side and the latency from the shared bus side to the processor side via the shared memory increase by a period of 1 to 2 PCLKs.

Figure 7:
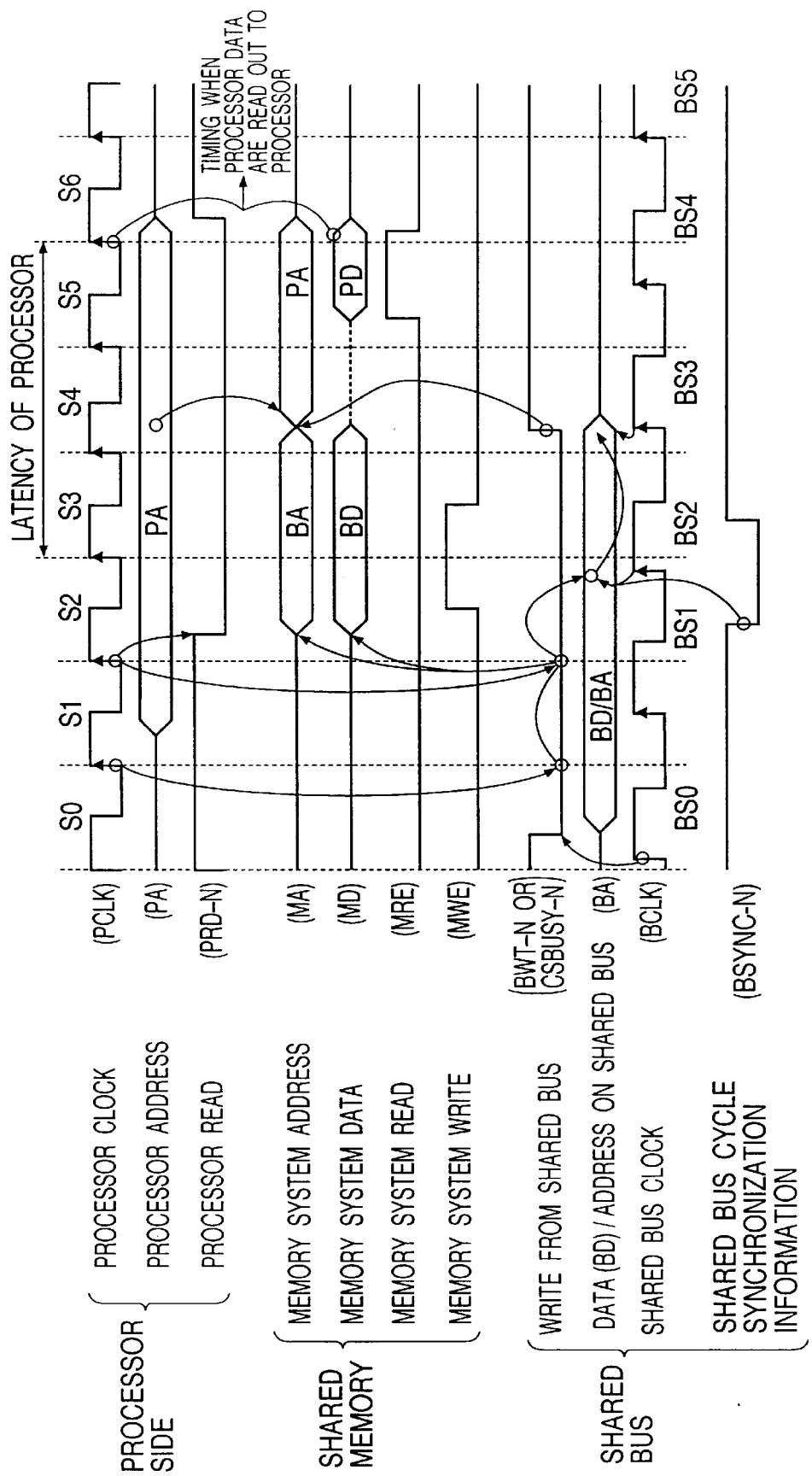
FIG. 7 is a timing chart showing control of access to a shared memory according to a prior art method.

FIG. 7 shows the operation of a broadcast type shared memory system in which PCLK and BCLK, which are typically used in the past, are asynchronous. Generally, the phases of each PCLK signal corresponding to each processor are not synchronized and when the types of the processors are different, their cycle is also different in many cases. The other conditions are the same as those in FIGS. 5 and 6.

In such a system, which is controlled by using an asynchronous reference clock among the processors and between the processor and the shared bus system, it is necessary to perform asynchronous synchronizing processing in various places to avoid mete states from occurring in various levels. In the example of FIG. 7, the bus cycle on the shared bus side is synchronized with PCLK so that data writing timing to the shared memory can mention a correct relationship to the access timing on the processor side. That is, thereby, the processing for synchronizing the bus cycle on the shared bus side, which is originally asynchronous to the bus cycle of the processor side, is performed.

Actually, it is synchronized to PCLK by passing CSBUSY-N and BWT-N signals through more than two stages of flip-flops, wherein PCLK operates as a trigger clock, accompanying an overhead of 1 to 2 PCLK periods. This overhead causes the write cycle from the shared bus side to start on the shared memory from the head of State S2 and it finishes after two states at the end of State S3. It is noted that, when the synchronization is completed, its information is communicated to the shared bus side by any means and the original shared memory system issuing the shared bus cycle performs a process for ending the shared bus cycle by utilizing that information. In the present embodiment, BSYNC-N signal is returned to the shared bus system side as the synchronizing information of the shared bus cycle.

At the time when BSYNC-N turns active (0 level is active level and signal change timing is synchronized with PCLK), processor generating the shared memory system of the shared bus cycle finishes the bus cycle being output to the shared bus system. Here, it generates a synchronous signal internally from BSYNC-N, synchronizes it to the BCLK signal by performing asynchronous synchronizing processing using BCLK. Then, corresponding to the change timing, it sets the bus cycle, i.e. the output of BD/BA, CSBUSY-N to the inactive state.

It can be seen from this that the shared bus system side also produces an overhead of a period of 1 to 2 bus cycles.

In the example of FIG. 7, the read cycle on the processor side finishes at the final point of State S5, which is behind by two states from the end of State S3 where the bus cycle of the shared bus side finishes on the shared memory by BD, BA and MWE signals as a result (MRE signal which corresponds to the read cycle turns active at the head of State S5 and inactive at the head of State S6). That is, a latency of three states (a period of 3×PCLK) is produced on the processor side.

When this example is compared to the access timing of the present invention shown in FIG. 5, it can be seen that the inventive system is much better than the prior art system in terms of both the overheads on both the processor side and the shared bus side and the communication latency among the processors via the shared memory.

Figure 8:
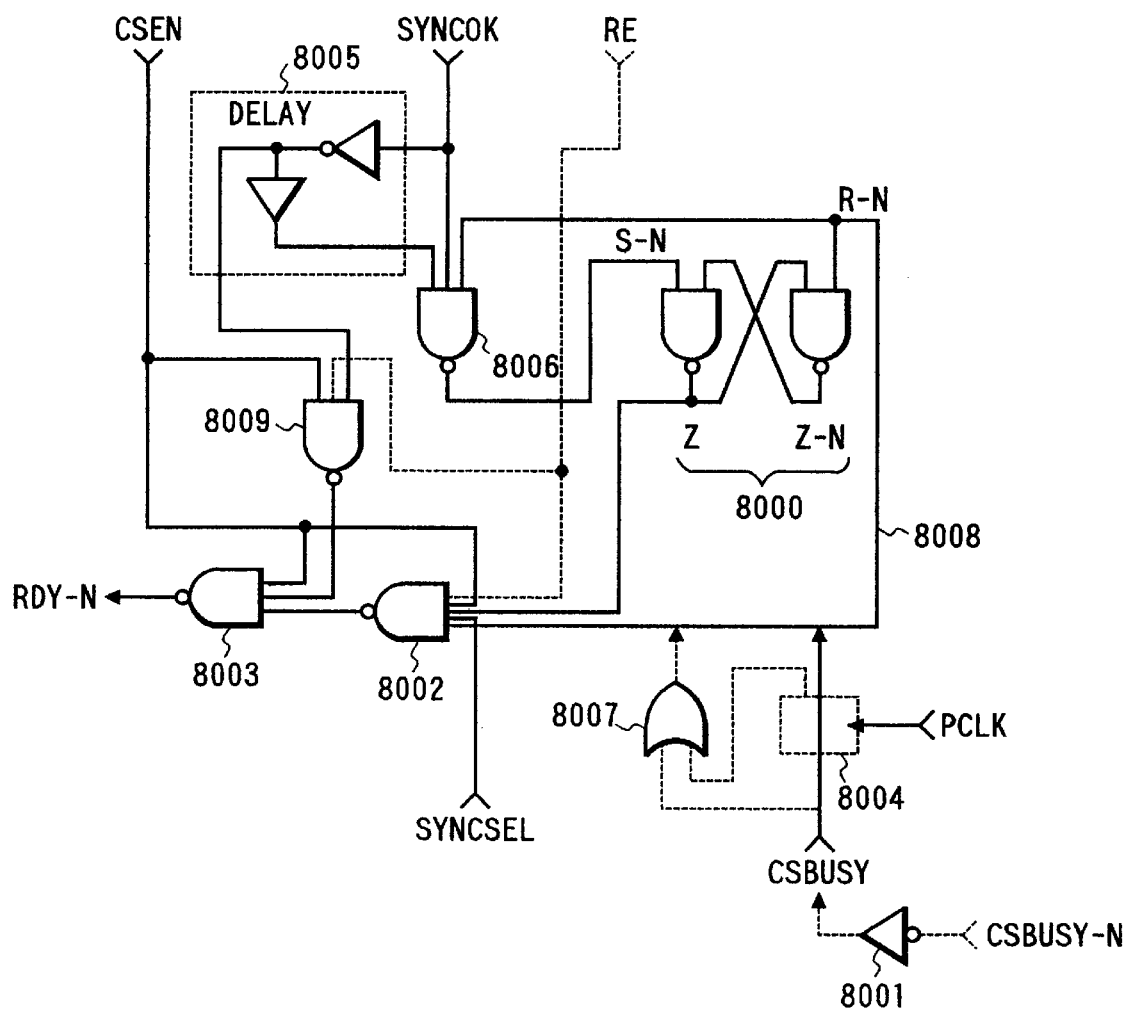
FIG. 8 is a schematic circuit diagram showing a ready signal generating circuit which is interlocked with a synchronization signal according to the present invention.

FIG. 8 shows an embodiment of a ready signal generating circuit interlocked with a synchronous signal (SYNCOK) which is a large characteristic point of the present invention. This circuit realizes the local synchronizing function for exchanging data on the shared memory among processors executing related processing without any contradiction, as explained with reference to FIG. 2, when it is operated by interlocking with the inter-processor synchronizing processing circuit 1000.

As described already concerning the detail function thereof, there is a possibility of producing a state in which no information necessary for the next task processing exists in the shared memory due to a communication latency, even if synchronizing processing is completed by the inter-processor synchronizing processing circuit 1000 and the SYNCOK signal turns active upon completion of the task processing by the processor. This circuit also executes the local synchronizing processing (interlock processing) between the shared memory control unit 2010 and the synchronizing processing circuit 1000 to effect a control so that no contradiction occurs in the context of exchange of data in the shared memory in order to avoid such a state and to be able to obtain necessary information reliably from the shared memory.

Basically, when CSBUSY is active at the point of time when SYNCOK turns active, the processor is inhibited from reading the contents of the shared memory until CSBUSY returns to the inactive state. More specifically, the read cycle on the processor side for accessing the shared memory is extended by keeping the RDY-N signal inactive when the above-mentioned condition holds to queue the processor side to perform interlock processing.

Each processor executing a related processing should have already finished to issue a write cycle on the processor side for storing necessary processing results at least in the task already processed into the shared memory at the point of time when the synchronizing processing is completed and SYNCOK (active in 1 level) turns active.

Accordingly, a write cycle for broadcasting information for conforming contents of each shared memory to all of the shared memory systems corresponding to each processor is continued to be generated until an actual write cycle to the shared memory, which corresponds to the write cycle on the processor side already issued and held within the shared memory system (in the write buffers 2004 and 2008 and others) of each processor, is completed, i.e. until information whose contents agree appear in the shared memory system 2006 of all the processors and each processor can obtain such information.

In that event, CSBUSY-N indicating that the shared bus system is active is continued to be held active, thus allowing the interlock by the above-mentioned logic. This logic of the interlock function will be detailed below by using the embodiment shown in FIG. 8.

It has been already explained that CSBUSY-N is a signal which is active at the 0 level and is generated corresponding to a BUSY signal from the bus arbiter circuit 1020, which is one of the control signals on the shared bus. It is connected to one input R-N of an R-S flip-flop 8000 via an inverter 8001. When the CSBUSY signal is inactive (it is inactive in initial state), 1 is out unconditionally at Z-N and 0 is output relatively at Z. The above state is the initial state.

It is noted that the output of an NAND gate 8006 is connected to the other input S-N. When the CSBUSY signal is active, the NAND gate 8006 detects a leading edge, when the SYNCOK signal turns active, from a signal from a circuit 8005 and the state of the SYNCOK signal, and generates a pulse (Lo pulse) at the S-N input of the R-S flip-flop 8000.

When that pulse is generated, the R-S flip-flop 8000 is set and 1 is latched at the Z output. However, if the SYNCOK signal is turned to the 0 level in the initial state, the NAND gate 8006 keeps outputting the 1 level and the Z output of the R-S flip-flop 8000 remains reset to 0 because the initial value of the CSBUSY signal is the 0 level, thus causing no contradiction with the above-mentioned initial state.

A NAND gate 8002 outputs the 0 level when the CSEN signal, indicating that the shared memory has been accessed, is active, when the R-S flip-flop 8000 is set by the pulse from the NAND gate 8006, outputting the 1 level at Z, and when the CSBUSY signal is active. This operates to inhibit the access to the shared memory from the processor side temporally, when the condition of interlock is set, by turning the rear NAND gate 8003 unconditionally to the 1 level, i.e. turning RDY-N inactive.

Although the present embodiment has been designed so that the interlock function acts in either the read cycle and write cycle when the processor accesses the shared memory, it may be arranged for the NAND gate 8003 to decode a condition in which a read enable signal from the processor is active, if it is desirable for such operation to be active only during the read cycle (Read enable signal RE whose active level is 1 is added to the input of the NAND gate 8002).

It is noted that the NAND gate 8003 is designed to return an active RDY-N signal to the processor only when the CSEN signal turns active, i.e. only when the processor accesses the shared memory system.

A NAND gate 8009 outputs the 0 level when the shared memory system is accessed and CSEN is at the active level (1 level) and SYNCOK is at the inactive level (0 level) (a signal obtained by inverting the SYNCOK signal is connected to an input of the NAND gate 8009). It drives the input of the NAND gate 8003, and the RDY-N signal is set to the inactive level (1 level) unconditionally by its output.

That is, when the processor accesses the shared memory system, and when the synchronizing processing circuit 1000 has not completed synchronizing Processing to the processor yet, the system operates so as to queue the accessing operation on the processor side to the shared memory. This is equivalent to the local synchronizing function disclosed in Japanese Patent Laid-Open No. Hei. 5-2568. It is of course possible to design the circuit so that the NAND gate 8009 detects the active state of the read enable signal RE to operate this function only when the reading operation to the shared memory occurs.

Thus, it can be seen that the interlock function of the present invention supports the inter-processor synchronizing processing interlocked with the inventive shared memory system in a manner like the prior art local synchronizing function disclosed in Patent Laid-Open No. Hei. 5-2568.

A condition for releasing the interlock and for completing the inventive local synchronizing processing is to turn the CSBUSY signal to the inactive state. When the CSBUSY signal turns inactive (0 level), the output of the NAND gate 8002 turns to 1 unconditionally and the Z output of the R-S flip-flop 8000 is also reset to the 0 level, returning to the initial state and releasing the interlock. It is noted that SYNCSEL (active in 1 level) is a selection signal for deciding whether the local synchronizing processing function of the interlock circuit should be activated or not.

The CSBUSY signal may be used after passing through several stages of flip-flops by using PCLK as a trigger clock signal, as shown by a dotted line in FIG. 8. FIG. 8 discloses a case when this technique is used by passing one state of the flip-flop 8004. Thereby, a hazard placed on the CSBUSY signal may be removed if it exists there. This method also makes it possible to set the flip-flop so that an interlocked time fully covers a time until writing of all necessary data to the shared memory becomes effective, i.e. a time until the data can be read reliably from the read port side, by delaying the CSBUSY signal by an adequate time.

In the present embodiment, the interlock period is shifted behind by a period of 1 PCLK from the time when the original CSBUSY signal turns inactive by delaying the CSBUSY signal by 1 PCLK period. Then, the control unit is designed so that the reading of all necessary data becomes effective in the shared memory immediately after the interlock is released. That is, in the case of the present embodiment, it is enough if the last write cycle is generated on the necessary shared memory and signals, such as Write Enable (WE) Write Address and Write Data (WD), are active at a timing before a point of time when the interlock is released, the RDY-N signal turns active and the bus cycle of the processor ends.

Considered from the aspect of the original timing when the CSBUSY signal turns inactive, this means that it is enough if the last write cycle has been generated on the shared memory in either state among two states (1 state=1 PCLK period) which ensue right after that timing.

As shown in the figure, if an OR logic result of the output of the flip-flop 8004 and the CSBUSY signal is obtained by using an OR gate 8007 and its output is used instead of the output of the flip-flop 8004, the interlock start condition may be set in almost the same way as the case when the flip-flop 8004 is not used, while keeping the interlock releasing time the same as the case when the flip-flop 8004 is used. Thereby, it becomes easy to design the circuit so that no status of a signal obtained in response to the CSBUSY signal at the input of the gate 8006 and at the R-N input of the R-S flip-flop 8000 has not turned active (1 level) yet at that point of time due to a signal delay even though the pending write cycle to the shared memory exists when the SYNCOK turns active.

Figure 9:
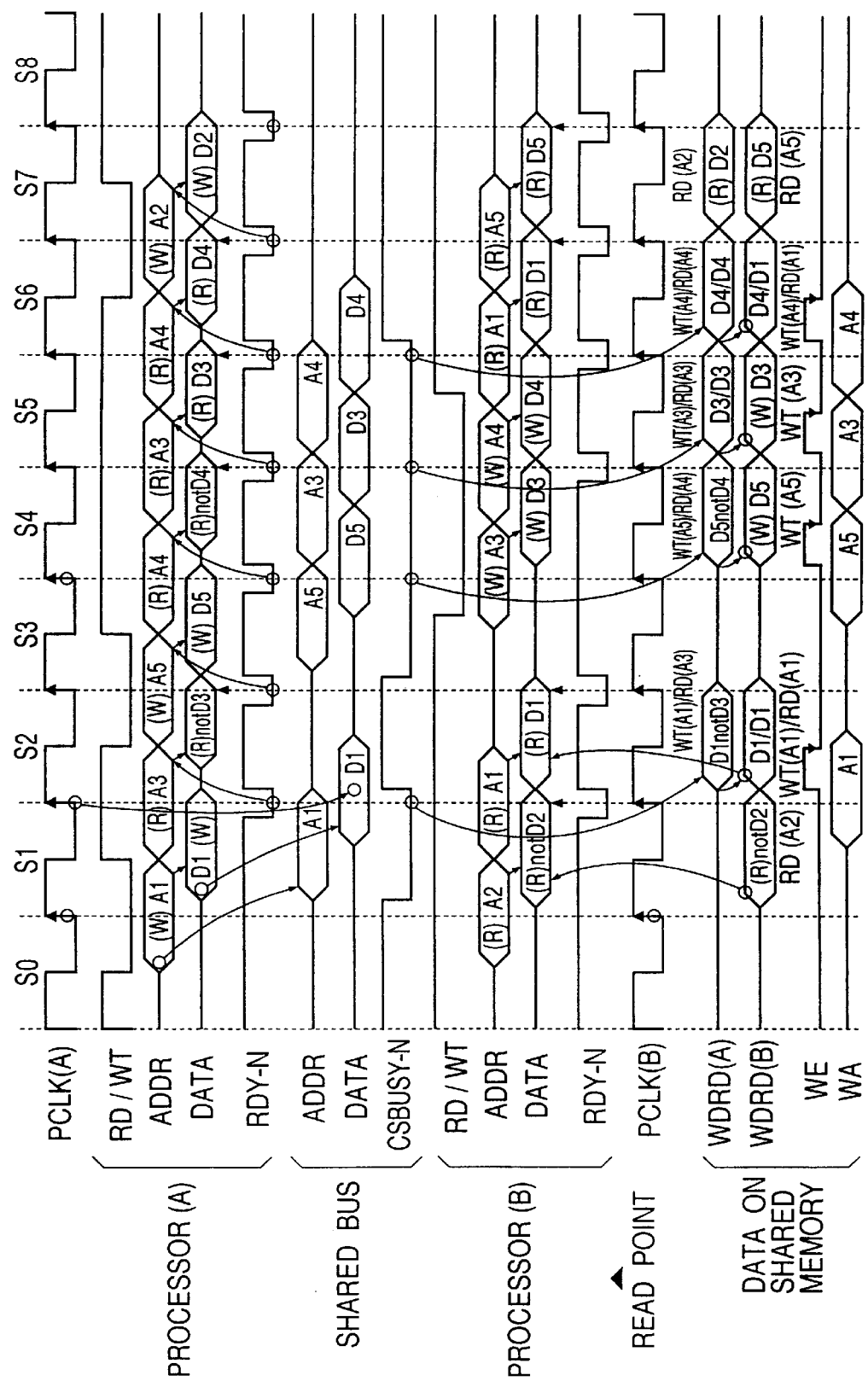
FIG. 9 is a timing chart showing access timings of the shared memory system of the present invention.

FIG. 9 shows another embodiment concerning to the access timing to the shared memory of the present invention.

While the access state on the shared memory between the processor side and the shared bus side has been shown in the example of FIG. 5, it has been presumed that a time of 2 processor cycles (by a period of 2×PCLK) at a minimum is necessary per one bus cycle as a condition of the bus cycle. In the example in FIG. 9, it is presumed that each bus cycle on the processor side, on the shared bus and the shared memory is formed of one processor cycle (by a period of 1 PCLK) at a minimum.

However, this is devised so as to be able to maintain an address access time for a relatively long time by providing a pipeline bus cycle for outputting an address precedently and executing input/output of data in the succeeding states (address bus and data bus are driven independently in one processor cycle respectively and are shifted by one processor cycle from each other).

The pipeline bus cycle of the present embodiment is characterized in that, if a RDY-N signal for the preceding bus cycle is returned after outputting an address (ADDR) for the bus cycle to be output next by at least one state (period of 1 PCLK), and when that bus cycle has been finished, the next address (if prepared already on the processor side) is output.

As for exchange of data corresponding to one address, input/output is executed between the processor at the end of the State, which is the next state to the State in which the address has been output. That is, operation of a data bus is delayed by one State from that of an address bus. The last point of the State in which data is exchanged between the processor is the ending address of that data.

If the processor is in a state capable of outputting the next address, it is point of a bus cycle for the capable of outputting the next address to the address bus already in the State in which the data is output and can output addresses preceedingly one after another in a manner of with the input/output of data, so that addressing or a pipeline bus cycle.

For example, in a processor A in FIG. 9, an address (ADDR) A1 is output immediately at State S0 in which the pipeline in parallel it is called pipeline processor could have been prepared for the address A1 because two or more preceding bus cycles have been finished already at State S0. Because it is a write cycle, data D1 is outputted so as to be written from the processor to the outside at the ensuing State S1.

Because one preceding bus cycle has been already finished at State S1, the processor outputs the (read cycle) in parallel with the output D1 of the data which corresponds to address A1 after outputting by one State the address A1. The RDY-N signal to the data D1 is taken next address A3 in to the processor A at the final point of State S1. At that time, the next address A5 (write cycle) is executed in parallel with an input operation not D3 of data to A3 in State S2.

As described above, even if the read cycle and write cycle exist mixedly, the address bus and data bus are driven in parallel and in a pipeline manner per unit of one processor cycle, making it possible to realize substantially 1 State/bus cycle.

In the embodiment of FIG. 9, an access state on the shared memory system in the case of exchanging information freely among the processors without controlling the synchronization, not interlocking with the inter-processor synchronizing processing circuit to give/take data in a unit of a task reliably without contradiction, is shown for a case of two processors (processors A and B) by way of example. In order to represent access to the shared memory in detail in a small space, it is presumed that cycles are all read or write cycles to the shared memory and that accesses to the other general resources or to the inter-processor synchronizing processing circuit 1000 are executed in parallel with that.

Such a processor system may be realized by adding a dedicated processor beside a main processor, or by constructing an advanced processing system having a bus system for accessing the shared memory system and a bus system for accessing the other general resources separately.

It is presumed that data D1, D2 and D5 are information to be written from the processor A side to the shared memory, and data D3 and D4 are information to be written from the processor B side to the shared memory, and that any one of them is read when it is to be read. When no necessary data is written to the shared memory yet and one preceding data (data written previously) can be read, it is expressed by adding "not", for example, not Dn.

Whether it is a read cycle or write cycle is indicated by an RD/WT signal (Hi-RD, Lo-WT) which is output in the same timing with the Address (ADDR). When a write cycle is generated, information (address, data, BUSY signal, etc.) for rewriting the shared memory is broadcasted to the whole shared memory system via the shared bus and a write cycle is generated on the shared memory of each processor to change its contents.

In the bus cycles of the processors, as seen in FIG. 9, (W) is affixed to a write cycle to the shared memory and (R) to a read cycle. The bus cycles on the shared bus are only write cycles necessarily and the CSBUSY-N signal (Low-active) is active during a period when the bus cycles are generated.

On the shared bus, address information and data information being output is shifted by about ½ State from the address and data output timing on the processor side and the CSBUSY-N signal is output at almost same timing with the Address on the shared bus. The state of the bus protocol on the shared bus is controlled in synchronism completely with the processor clock signal (PCLK). For example, the Address A1 of the processor A output at State S0 is output for one State from around the head of State S1 on the shared bus, and Data D1 of the processor A output from the head of State S1 is output for one State from around the middle of State S1 on the shared bus.

The state of the bus protocol on the shared memory is also controlled in synchronism with the processor clock signal (PCLK). FIG. 9 shows the states of Write Data/Read Data corresponding to the processors A and B, respectively, and the timings at which the Write Address (WA) and the Write Enable (WE) are generated.

Next, the bus cycles on the shared memory will be explained in detail. When the CSBUSY-N signal on the shared bus turns active in one State, address information on the shared bus is gated so that it becomes effective to the shared memory and is provided to the write port of the shared memory for a period of about one State as a Write Address (WA) around the middle of that State. This timing may be obtained by gating the contents of ADDR on the shared bus at the middle of the State by a gate latch by using PCLK as an inversive clock signal (PCLK-N), by transmitting the information and latching at the end of the State and by providing it to the shared memory as a Write Address (WA) after keeping a period of about ½ State.

Meanwhile, the Write Data information from the shared bus side may be provided to the shared memory as Write Data (WD) by gating the contents of DATA on the shared bus by a gate latch by using PCLK as a clock signal at the head of a State, by transmitting the information and latching it at the middle of the State and by keeping it for a period of about ½.

A Write Enable signal is generated by responding to the CSBUSY-N signal at the timing when Write Data (WD) is provided to the shared memory, i.e. so that it turns active by about ½ State from the head of the State. The timing is adjusted so that the value of WA becomes effective to the shared memory during the period when WE is active.

In accordance with the present invention, it is presumed that a write cycle to the shared memory is generated to the shared memory system of all the processors in common and almost at the same time.

The read cycle on the shared memory is executed in parallel with the write cycle by using the read port as described before and a cycle having totally different contents corresponding to a bus cycle of a corresponding processor is generated on each shared memory.

In the figure, the read cycles and write cycles are generated ln parallel with cycles marked with WT (A1)/RD (A3), WT (A1)/RD (A1), WT (A5)/RD (A4), WT (A3)/RD (A3), WT (A4)/RD (A4), and WT(A4)/RD(A1). In a case when only the read cycle is generated, it is marked with (R) and when only the write cycle is generated, it is marked with (W).

As more detail information, each cycle is marked at the upper or lower stage with RD(Ax) in case of a read cycle, WT(Ax) in case of a write cycle and WT(Ax)/RD(Ay) in case a read cycle and a write cycle are generated in parallel. Ax and Ay are address information which correspond to data information Dx and Dy to be written from the processor.

Comparing the timing for generating an Address (RA) and Data (RD) on the shared memory in the read cycle with that of the write cycle, it may be considered to be almost the same with that of the write cycle, except for the fact that the data input/output direction is reversed (data is given to the processor in the read cycle and taken from the processor in the write cycle). When a Read Enable (RE) exists, the timing when it turns active is from the head or middle of a State in which Read Data RD turns active to the final point of that State.

Here, the timings which occur until the instant when data on the shared memory, whose contents has been changed corresponding to a write cycle from a processor, can be read actually from another processor will be examined. In the present embodiment, the processor A performs an operation for reading Data D3, which corresponds to Address A3, twice (starts to output the address at States S1 and S2, respectively) and an operation for reading Data D4 Address A4 twice (starts to output the address at State S3 and S5).

However, the processor B generates a bus cycle for changing the contents of Address A3 on the shared memory at the point of time of State S3. Data D3 is output from the processor B at the head of State S4. Data D3 actually becomes effective on the shared memory and can be read from the processor A from the point of time when the Write Enable (WE) turns active at the head of State S5.

Similarly, the processor B generates a bus cycle for changing the contents at Address A4 on the shared memory at the point of time of State S4. Data D4 is output from the processor B at the head of State S4. Data D4 actually becomes effective on the shared memory and can be read from the processor A from the point of time when the Write Enable (WE) turns active at the head of State S6.

While the processor A reads Data D3, which corresponds to Address A3, at each State S2 and S5, and Data D4, which corresponds to Address A4, at each State S4 and S6, it cannot read the value of Data D3 which is to be rewritten by the processor B in State S2, and so it reads the contents of Address A3 on the shared memory previously set. As for the value of Data D4, although the processor A reads it from the shared memory at each State S4 and S6, it cannot read the value of Data D4 which is to be rewritten by the processor B and reads the contents at Address A4 on the shared memory.

In State S5, in which Data D3 from the processor B is reflected on the shared memory, the processor A can read the actual value of Data D3 and can read the actual value of Data D4 which has been set by the processor B in the same manner in State S6.

It can be seen from the present embodiment that a latency from when the processor B outputs data till when the processor takes in that data via the shared memory is two States. Among that, the latency on the shared memory system side is one State (period of 1 PCLK), indicating that a very efficient data sharing mechanism using the shared memory is being realized.

It can be seen from FIG. 9 that the system operates in the state in which absolutely no access contention of the read cycle and write cycle on the shared memory occurs. Further, because information is exchanged on the shared memory by the broadcasting only in the write cycle and no loss of access time and overhead due to access contention or the like is caused in the bus cycle on the shared memory, both the shared bus side and the processor side are allowed to finish the bus cycle in one State.

It means that a shared memory system having a theoretically maximum efficiency can be provided. For example, even if a processor system having the bus efficiency of the present embodiment executes thereon an application which imposes the most severe condition on the shared memory system, in which input/output of all data is carried out via the shared memory system, the inventive shared memory system is considered to have a level of capacity capable of carrying out a processing without having any overhead using as many as three processors.

This is because, while it has been known that an average rate of write cycles in all bus cycles is about 30%, the inventive shared bus system is at a level capable of fully absorbing a number of write cycles of three processors even if they are all accesses to the shared memory (because the shared bus system supports only write cycles, a frequency of occurrence of write cycles on the system determines its performance).

Consideration will be given below as to how many processors may be connected effectively in an actual multi-processor system when the inventive shared memory system is used.

It has been described that the use of the inventive shared memory system allows up to three processors to be connected without exerting any effect on the performance of the system. However, this limitation is not realistic because it presumes a case wherein each processor within the system accesses the shared memory system almost in the worst condition at random and that processors always are accessing the shared memory in all processor cycles.

Actually, if an internal command processing of a processor (e.g. inter-register operation) is processed in one processor clock on average and a processing involving an access to the outside, such as a memory access, is processed in two processor clock cycles at best (among that, one processor clock cycle is time for accessing outside data), it takes 1.5 processor clock cycles of processing time on average per one command, assuming that 50% of commands involve an external access.

That is, an average number of processor clock cycles necessary for accessing outside data is 0.5 clock cycle per command and a rate in the whole bus band (assuming an access capability of one processor clock cycle per data) is 33% (0.5/1.5×100%). Then, among the commands involving an external access, 10 to 30% are accesses to the shared memory system in a typical application in a closely coupled multi-processor system.

Even though the rate of accesses to the shared memory system is generally less than 1% in many cases in a loosely coupled system, it is the present condition that the loss of performance of the system caused by the communication overhead and access contention is significant in the conventional system. In the prior art closely coupled multi-processor system, the system performance drops remarkably if three to four processors are connected, even if the frequency of access to the shared memory system is around 10%.

When the inventive shared memory system is used under the condition presumed for the above-mentioned processor performance, and when a frequency of random access to the shared memory system seen from the processor side is supposed to be about 10% of all the external accesses and 30% thereof to be write cycles, a substantial frequency of access to the shared memory (equal to a rate of occupancy of the shared bus system) is only about 1% per processor (0.5×0.1×0.3/1.5×100%) from the characteristic of the inventive shared memory system. Even if the frequency of random access to the shared memory system is presumed to be about 30% of all the external accesses, the substantial frequency of accesses to the shared memory is about 3% (0.5×0.3×0.3/1.5×100%).

It means that one set of the inventive shared memory system allows a closely coupled multi-processor system composed of 30 to 100 processors to be operated effectively. The superiority of the inventive system will be seen clearly when the technology of the present invention is compared with the prior art in a system comprising from 3 to 4 to about 100 processors.

While the performance of the inventive shared memory system when one set thereof is provided has been evaluated above, it becomes possible to support a number of processors which comprises several sets of shared memory systems, if a plurality of sets of the inventive shared memory system are provided and shared data is distributed and disposed well to each shared memory system.

Random shared data may be distributed on average to the plurality of sets of a shared memory system effectively by a system of interleaving the shared memory corresponding to the plurality of sets by a method of numbering each set of the shared memory system by a remainder obtained when an address value is divided by a set number of the shared memory system and assigning an address group having the same remainder to the shared memory system having the number corresponding to the remainder, for example.

If functions, uses, use methods and the like of the shared data may be classified, it is possible to provide separate shared memory systems by optimizing by a unit of that classification to functionally distribute the shared data and to design it so that access on the whole is distributed on average to each shared memory system.

Figure 10:
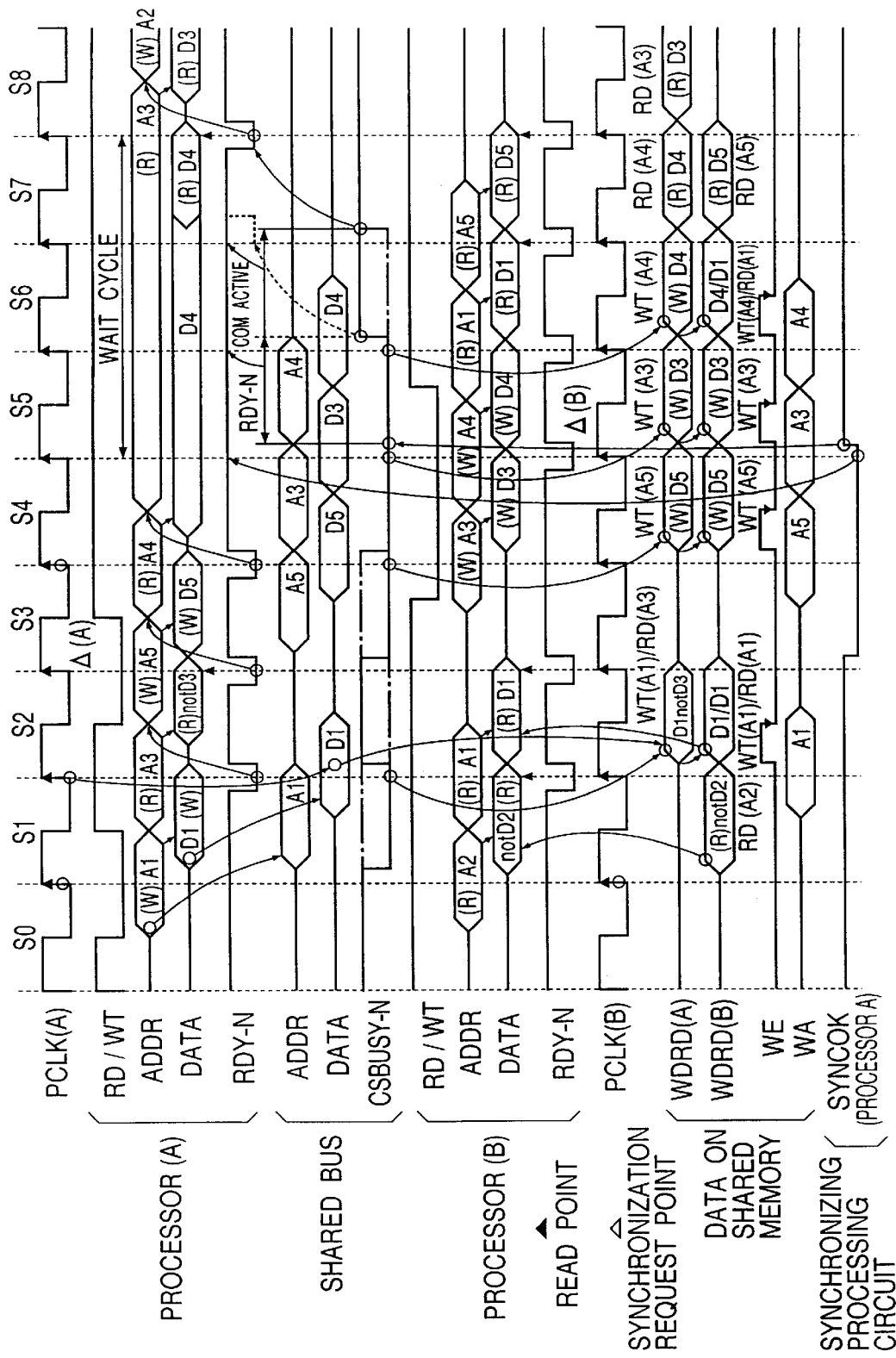
FIG. 10 is a timing chart showing access timings when the inventive shared memory system is interlocked with an inter-processor synchronizing mechanism.

FIG. 10 shows an example of shared memory accessing timings when the local synchronizing processing function for matching synchronizing processing completion time with time when data becomes effective adequately on the shared memory by the interlock circuit shown in FIG. 8 is made effective by interlocking with the inter-processor synchronizing processing circuit 1000. Conditions are totally the same with those in FIG. 9, except that the local synchronization function is operative.

The bus state on the processor A side operates with the same timing as that in FIG. 9 to the end of State S3 and that on the processor B side to the end. What are different are the operation on the processor A side after State S3 in which the SYNCOK signal, which is synchronization completion information from the synchronizing processing circuit 1000, turns active, and a write cycle on the shared memory system after State S6 which changes accordingly and read and write cycles on the shared memory after State S4.

After generating a write cycle to Address A5 in State S2, the processor A generates a Synchronization Request (SREQ) for synchronizing with the processor B and sends it to the synchronizing processing circuit 1000 in parallel with that bus cycle at the head of State S3. This point of time may be considered to be a point of time when the task of the processor A is completed and the write cycles to the shared memory generated before State S3 (write cycles to Addresses A1 and A5) may be considered to be resultant data which has been processed in the above-mentioned task and which may be utilized by the other processor.

Receiving that Synchronization Request (SREQ), the synchronizing processing circuit 1000 sets the SYNCOK signal to the processor A inactive (0 level) and keeps it inactive, as shown in FIG. 10, because the processor B has not yet finished processing a predetermined task at this point of time.

A write cycle to Address A4 in the shared memory started at State S4 is the final bus cycle to the shared memory in the task on the processor B side which should be synchronized with the processor A, and the processor B generates a Synchronization Request to the synchronizing processing circuit 1000 at the head of State S5.

Receiving that signal, the synchronizing processing circuit 1000 recognizes that the synchronizing processing between the processor A and the processor B has been completed (synchronized) and immediately returns the SYNCOK signal sent to the processor A to the active level (1 level). While the synchronizing processing circuit 1000 tries to set the SYNCOK signal to the processor B to the inactive level with this timing by receiving the Synchronization Request (SREQ) from the processor B, the synchronizing processing is completed immediately and the SYNCOK signal is returned to the active level immediately because the task on the processor A side has been already finished and the Synchronization Request (SREQ) which comes with that has been also generated.

Due to that, because the SYNCOK signal of the processor B is maintained in substantially the inactive state, the processor B receives no effect caused by change of the SYNCOK signal. That is, the operation efficiency of the processor B is substantially at the same level with that in the example of FIG. 9 and it operates with maximum efficiency without receiving any effect of synchronizing processing (without producing an overhead or the like for synchronization caused when the processor is queued for synchronization for example).

Thus, according to the embodiments of the present invention, the last processor which outputs a Synchronization Request among processors which should be synchronized with each other can operate without dropping its processing efficiency. It is noted that it is possible to guarantee that the SYNCOK signal turns to the inactive state (0 level) to generate an inactive level pulse reliably even under such a condition by putting, for example, the timing for outputting the Synchronization Request (SREQ) forward by about ½ State to match almost with a timing for outputting an address which corresponds to the last write cycle to the shared memory in the task which the processor is going to finish.

In the example in FIG. 10, this may be achieved by matching the processor B output Synchronization Request (SREQ) with the timing for outputting Address A4 in State S4. Guaranteeing the edge where the SYNCOK signal turns active is an important condition for establishing the time to start the interlock in the example of the interlock circuit disclosed in FIG. 8.

Originally, the processor A can execute other processing which is not involved in accessing the shared memory or the next task processing in advance even if the synchronizing processing has not been actually completed in and after State S4 following the time when the Synchronization Request (SREQ) has been generated at the head of State S3. This is because the present system supports the function which is basically the same as the local synchronization function disclosed in Japanese Patent Laid-Open No. Hei. 3-234535.

However, in the example in FIG. 10, the processor A accesses to Address A4 of the shared memory in State S3 immediately after outputting the Synchronization Request (SREQ) because of the space. Because the SYNCOK signal is inactive (0 level) at this point of time, the bus cycle on the processor A side enters a queue state in and after State S5, not reading a value of Data D4 from the shared memory until the local synchronization is completed.

As has been described, the present invention is characterized in that the interlock function, as shown in FIG. 8, is added to the local synchronizing function this time in order not to cause any contradiction in the context of exchange of data among processors when it is interlocked with the inter-processor synchronizing processing function by using the inventive shared memory system.

As for the local synchronizing processing method, assuming an access state to the shared memory similar to FIG. 10 in an embodiment described in Patent Laid-Open No. Hei. 3-234535, an active RDY-N signal is returned to the processor A assuming that the synchronizing processing has been completed in State S5 in which the SYNCOK signal returns to the active level to advance the processor A to the next processing.

Accordingly, the processor A enters a WAIT CYCLE by the period of State S5, i.e. the period of 1 PCLK, in the prior art method, whereas the use of the inventive shared memory system allows the read cycle and write cycle to the shared memory to be executed in parallel. If the method similar to the prior art is adopted, the read cycle on the processor A side is executed with a very fast timing (in State S5) regardless of the timing of the write cycle, and the Data D4 corresponding to Address A4 to be received from the processor B is not effective yet on the shared memory at the point of time in State S5, so that processor A is unable to access data which the processor A needs to obtain.

A point of time when the Data D4 which corresponds to Address A4 from the processor B becomes actually effective on the shared memory is at a point of time in State S6 and the processor A must be queued at least until that time. The present invention normalizes the contradiction of the context regarding such exchange of data by means of the interlock circuit shown in FIG. 8.

Next, the operation states of the interlock circuit in the timing chart in FIG. 10 will be explained. When the read cycle to Address A4 on the shared memory on the processor A side is generated in State S3, RDY-N signal in FIG. 8 is fixed to the inactive state in State S4 because the SYNCOK signal is inactive already in State S3. Accordingly, the bus cycle of the processor A enters a WAIT CYCLE in and after State S5 until the RDY-N signal turns active, and so the bus cycle to Address A4 is prolonged (bus cycle is not finished until active RDY-N is returned).

However, because the processor A is executing a pipeline bus cycle, the next address value (A3) already in State S4. This mechanism has been before.

Next, in State S5, the Synchronization Request (SREQ) signal on the processor B side is sent to the synchronizing processing circuit 1000, and upon receiving it, the synchronizing processing circuit 1000 turns the SYNCOK signal to the processors A and B to the active level assuming that they have been synchronized and the synchronizing processing has been completed. Because the CSBUSY-N signal has become active (0 level) at this time, the interlock circuit of the present invention functions corresponding to the change of the leading edge of the SYNCOK signal.

The interlock circuit keeps the RDY-N signal to the processor A side active (1 level) until the CSBUSY-N signal returns to the active level. Because the CSBUSY-N signal is used after shifting by a period of 1 PCLK by PCLK by using the flip-flop 8004 shown in FIG. 8 in the present embodiment, the internally effective CSBUSY-N signal may be considered to be equivalent to those having a timing of change indicated by the dashed lines.

Accordingly, the CSBUSY-N signal returns to the inactive state internally at the head of State S7 (the original CSBUSY-N signal returns to inactive in State S6). Corresponding to that, the RDY-N signal to the processor A turns active in the later half of State S7, and the processor A finishes the bus cycle to Address A4 at the final point of State S7.

Because it is presumed in the present embodiment that the Read Enable signal RE (active level: 1) is input to the NAND gates 8002 and 8006 in FIG. 8 so that the local synchronizing function operates only when the read cycle to the shared memory is generated, the States in which the RDY-N signal is fixed in the inactive state by the inventive local synchronizing function are the three States S4, S5 and S6. Among them, the control of the RDY-N signal in State S4 is what has bee n supported by the prior art local synchronizing function, as described before, and the control of the RDY-N signal in States S5 and S6 is what is supported by the local synchronizing function which has been added anew by the interlock circuit in accordance with the present invention.

Thereby, the value of Data D4 which corresponds to Address A4 of the shared memory generated in State S3 is taken into the processor A at the end of the State S7, and the processor A returns to normal operation (next processing or next task) in and after State S8. It is noted that the bus cycle to Address A3 generated by the processor A in State S4 and queued is finished as the processor A obtains corresponding Data D3 (data rewritten by the processor B) in State S8 after completing the local synchronizing processing.

In the embodiment shown in FIG. 10, the local synchronizing processing may be executed correctly by using the CSBUSY-N signal with its own timing (shown by solid lines), rather than by shifting it internally. That is, when the change timing of the original CSBUSY-N signal is used, the interlock is released corresponding to the timing when the CSBUSY-N signal turns active in State S6, and the target Data D4 and active RDY-N signal are generated with a timing indicated by a dotted line on the data bus (DATA) and RDY-N signal on the processor A side.

Corresponding to that, the processor A finishes the bus cycle corresponding to Address A4 at the final point of State S6 and advances to the next processing.

In the present embodiment, it has been already described that it takes a latency of only one State from when intended data is output from side of transmitting data till when the processor on the it becomes effective on the shared memory and can be read. Accordingly, because Data D4 has been already effective on the shared memory in State S6, which is the next State to State S5 in which the processor B outputs Data D4 which corresponds to Address A4 on the shared memory, the processor A reads it at the final point of State S6 and operates without any trouble in and after State S7 even if it shifts to the next cycle.

Further, if the circuit is designed so as to use the CSBUSY-N signal internally via the OR gate 8007 shown in FIG. 8, the interlock circuit will not fail to take the timing for interlock even if the processor B outputs the Synchronization Request (SREQ) in State S3 and the synchronizing processing circuit immediately judges that the synchronization has been completed in that State, setting the SYNCOK signal to active level, because the CSBUSY-N signal is active already at that coins of time.

That is, it is preferable to design the circuit so as to use the CSBUSY-N signal on which the dashed line and solid line are superimposed in FIG. 10 (CSBUSY-N signal having a logic of generating 0 level if either one is 0 level) internally. It is noted that a condition for ending the interlock is the same as that of the case when the CSBUSY-N signal is used simply by shifting it (the case shown by the dashed line).

When the original CSBUSY-N signal is directly used, a condition for starting the interlock is almost the same as that of the case when the OR gate 8007 is used as described above. Adding all the conditions, it may be judged that the method of using the CSBUSY-N signal directly as the signal 8008 in FIG. 8 can enhance the efficiency of the present embodiment most.

It is noted that the embodiment disclosed in Japanese Patent Laid-Open No. Hei. 5-2568 uses a one port shared memory unit operating as shown in FIG. 6, as described before, so as not to cause contradiction in exchanging data among processors even when it is interlocked with the inter-processor synchronizing processing mechanism by queuing a read cycle and giving priority to a write cycle when the read cycle and write cycle contend for an access to the shared memory.

This is because the processor, which is synchronization, should have finished generating all necessary write cycles to the shared memory system by the time when the synchronizing processing circuit generates synchronization completion information (SYNCOK) and the processor side is queued unconditionally until when the contents of all the shared memories of each processor is changed by those write cycles, if the write cycle is given priority over the read cycle.

That is, it may be said that the interlock described here suppresses a side effect brought function about by the increase of speed of data exchange among processors by enhancing the efficiency of accesses by using the two-port shared memory unit.

Finally, a measure which may be adopted as a method for dividing functions of each logical circuit section of the shared memory system in integrating it into a LSI (integrated circuit) will be described below.

i) Integrate the memory unit 2006 or 3006 into one chip or a plurality of chips of an LSI (integrated circuit). That is, a memory LSI is fabricated so as to comprise a plurality of memory cells (e.g. cells as shown in FIG. 4); provide at least a Read Data (DO) output pin and a corresponding Read Address (RA) input pin, a Write Data (DI) input pin and a corresponding Write Address (WA) input pin and a Write Enable (WE) signal input pin for commanding to write the above-mentioned Data DI to a memory cell corresponding to the specified Write Address (WA); provide means for disposing the memory cell corresponding to the Write Address WA and Read Address RA and setting at least 1 bit of the Write Data DI obtained from the Write Data input pin at the input (D) side of at least one memory cell which corresponds to the specification of the WA to latch to the memory cell to be written by Write signal (WR) generated corresponding to the WE; and provide means for selecting an output (Z) of at least one memory cell corresponding to the specification of the RA to output to the data output pin as at least one bit of the Read Data DO.

The memory LSI is also provided with a function of transmitting and outputting a value specified to the Write Data (DI) input pin to the side of the Read Data (DO) output pin when the Write Enable (WE) signal input pin is at the active level and when address values given to the Write Address (WA) input pin and the Read Address (RA) input pin are the same.

ii) Integrate each of the shared memory systems 1010 through 101n provided in correspondence to each processor into one LSI, respectively. The two-port shared memory 2006 within the shared memory system having the same function with that shown in i) is integrated into the shared memory system LSI or is constructed as another system by the one-chip memory LSI or the memory LSI of plurality of chips shown in the shared memory system LSI, i), not integrating within and is used by connecting with the shared memory system LSI via DI, DO, RA, WA and WE pins. In this case, it is necessary to provide the DI, DO, RA, WA and WE pins for connecting signals with the memory LSI as shared memory system LSI input/output pins.

Further, the input/output buffer systems 2015 through 2017 and the like for switching accesses to the shared bus system may be constructed as another one chip LSI or an LSI of a plurality of chips.

iii) Construct the shared memory control unit 2010 as a one chip LSI and construct part of the shared memory systems 1010 through 101n excluding the shared memory control unit 2010 and including the two-port shared memory 2006, the input/output buffer systems 2015 through 2017 and the like as another one chip LSI. Those two LSIs are used by connecting on the level of access control signals to the shared memory and shared bus system.

According to the embodiments described above, the following effects may be obtained.

(1) The two-port memory unit (comprising read and write ports) which can be operated independently and in parallel is used for the shared memory within the shared memory system. Thereby, read and write cycles to the shared memory may be executed in parallel, bringing about an effect of improving the total throughput to the shared memory system because a latency which results for data conforming processing among shared memories and interprocessor data transfer processing can be shortened and the loss caused by the access contention among the processors can be reduced considerably.

(2) An overhead for synchronizing asynchronous circuits may be eliminated and a communication latency may be improved by synchronizing the whole shared system with one clock.

(3) When the shared memory system is operated by interlocking with the inter-processor synchronizing processing circuit, a local synchronizing interlock circuit is provided to queue a read cycle of the processor during a period from when the synchronizing processing circuit indicates completion of the synchronization till when information on the shared memory is actually rewritten to a state effective for the purpose in order to guarantee that the information generated by the intended task is exchanged reliably via the shared memory among the tasks controlled by the synchronizing processing. Thereby, the inter-processor synchronizing processing may be executed reliably without contradiction in a manner guaranteeing the exchange of data among tasks, bringing about an effect of automatically controlling and suppressing the processor from erroneous processing by accessing old information.

While the described embodiments represent the preferred forms of the present invention, it is to be understood that modifications thereto will occur to those skilled in the art without departing from the spirit of the invention. The scope of the invention is therefore to be determined solely by the appended claims.

What is claimed is:

1. A shared memory system, comprising:
a plurality of memory units, each provided in correspondence to a respective one of a plurality of processing units and being connected between said one of said plurality of processing units and a shared bus system, each memory unit storing processing results of its corresponding processing unit and processing results of other processing units obtained via said shared bus system,
said each memory unit, having memory cells therein, includes write address specifying means for specifying a memory cell for writing data thereto and read address specifying means for specifying a memory cell for reading data therefrom provided independently of each other; and
means for executing an operation for reading data from a memory cell specified by said write address specifying means during a data writing operation to the same memory cell.

2. A shared memory system, comprising:
a plurality of memory units, each provided in correspondence to a respective one of a plurality of processing units and being connected between said one of said plurality of processing units and a shared bus system, each memory unit having memory cells which can be specified by an address for storing processing results of its corresponding processing unit and processing results of other processing units obtained via said shared bus system,
said each memory unit includes write address specifying means for specifying a memory cell for writing data thereto and read address specifying means for specifying a memory cell for reading data therefrom provided independently of each other;
data input means for selecting either data sent from said corresponding processing unit or from said shared bus system to write said data to a memory cell within said memory unit specified by said write address specifying means;
data output means for reading data from the memory cell specified by said read address specifying means during a data writing operation performed by said data input means to the same memory cell; and
write information output means for outputting data written by said processing unit to the memory cell within said corresponding memory unit.

3. A shared memory system, comprising:
a plurality of memory units, each provided in correspondence to a respective one of a plurality of processing units and being connected between said one of said plurality of processing units and a shared bus system, each memory unit having memory cells which can be specified by an address for storing processing results of its corresponding processing unit and processing results of other processing units obtained via said shared bus system,
said each memory unit, having memory cells therein, includes write address specifying means for specifying a memory cell for writing data thereto and read address specifying means for specifying a memory cell for reading data therefrom provided independently of each other;
selecting means for selecting data and an address among data and addresses sent either from a corresponding processing unit or from said shared bus system; and
write information output means for outputting data sent from a processing unit to its corresponding memory unit and written to a memory cell therein and to said shared bus system; and
wherein each memory unit comprises:
write address specifying means for specifying an address where data is written and writing means for writing data to a memory cell at the specified address; and
read address specifying means for specifying a memory cell by its address to read data and data reading means for reading data from said memory cell during the operation of said writing means for writing data.

4. A shared memory system, comprising:
a plurality of memory units, each provided in correspondence to a respective one of a plurality of processing units and being connected between said one of said plurality of processing units and a shared bus system, each memory unit having memory cells which can be specified by an address for storing processing results of its corresponding processing unit and processing results of other processing units obtained via said shared bus system;
data input means for selecting either data sent from said corresponding processing unit or from said shared bus system to write said data to a memory cell within said memory unit by specifying the address of said memory cell;
data output means for reading data by specifying a memory cell by its address during a data writing operation performed by said data input means to the same memory cell;
write information output means for outputting data written by said processing unit to the memory cell within said corresponding memory unit; and synchronization control means for synchronizing a timing when a processing unit read data from its memory unit and a timing for writing data sent from said shared bus system to said corresponding memory unit with one reference clock.

5. A shared memory system, comprising:

a plurality of memory units, each provided in correspondence to a respective one of a plurality of processing units and being connected between said one of said plurality of processing units and a shared bus system, each memory unit having memory cells which can be specified by an address for storing processing results of its corresponding processing unit and processing results of other processing units obtained via said shared bus system;

data input means for selecting either data sent from said corresponding processing unit or from said shared bus system to write said data to a memory cell within said memory unit by specifying the address of said memory cell;

data output means for reading data by specifying a memory cell by its address during a data writing operation performed by said data input means to the same memory cell;

write information output means for outputting data written by said processing unit to the memory cell within said corresponding memory unit;

means, provided in each processing unit, for outputting a synchronization request signal which turns from inactive to active when processing in the processing unit ends; and synchronizing means for permitting the processing unit outputting the synchronization request signal to read data from the memory unit corresponding to that processor when all of the synchronizing processing completion signals from each processing unit which performs processing in concert have turned active.

6. The shared memory system according to claim 4, further comprising a read data latch, provided in said data reading means of a memory unit, for latching data to be read.

7. A memory cell integrated device having a plurality of memory cells, comprising:

read address specifying means for causing said plurality of memory cells to correspond to read and write addresses to specify a memory cell from which data is read in response to a read address;

reading means for reading data from a memory cell specified by said read address specifying means;

write address specifying means, provided independently from said read address specifying means, for specifying a memory cell to which data is written by a write address; and writing means, provided independently from said reading means, for writing data to a memory cell specified by said write address specifying means, whereby said memory LSI allows data reading processing and data writing processing to be executed in parallel.

8. A memory cell integrated device having a plurality of memory cells, comprising:

read address specifying means for causing said plurality of memory cells to correspond to read and write addresses to specify a memory cell from which data is read in response to a read address;

reading means for reading data from a memory cell specified by said read address specifying means;

write address specifying means, provided independently from said read address specifying means, for specifying a memory cell to which data is written by a write address; and writing means, provided independently from said reading means, for writing data to a memory cell specified by said write address specifying means;

said write address specifying means comprising:
a write address pin for inputting a write address;
means for selecting a memory cell specified by a write address;
a write enable signal input pin for receiving a command to write data to a memory cell; and
means for generating a write signal corresponding to said write enable signal; wherein said writing means comprises:
a data input pin for inputting data, and
means for setting data input from said data input pin to an input of a memory cell specified by a write address and for latching the data to that memory cell using said write signal;

said read address specifying means comprises:
a read address pin for inputting a read address, and
means for selecting a memory cell specified by a read address;

said reading means comprises:
a data output pin for outputting data, and
means for reading data stored in a memory cell specified by a read address and for outputting it to said data output pin; and
said memory cell integrated device allows a data reading processing and a data writing processing to be executed independently and in parallel.

9. The memory cell integrated device according to claim 8, further comprising a read data latch, provided in said reading means, for latching data read from a memory cell.

10. A parallel processing system, comprising:

a plurality of processing units, a shared bus system and a plurality of memory units, each memory unit provided in correspondence to a respective one of said plurality of processing units and being connected between said one of said plurality of processing units and said shared bus system, each memory unit storing processing results of its corresponding processing unit and processing results of other processing units obtained via said shared bus system, said each memory unit, having memory cells therein, includes write address specifying means for specifying a memory cell for writing data thereto and read address specifying means for specifying a memory cell for reading data therefrom provided independently of each other; and means for executing an operation for reading data from a memory cell specified by said write address specifying means during a data writing operation to said memory cell.

11. A parallel processing system, comprising:

a plurality of processing units, a shared bus system and a plurality of memory units, each provided in correspondence to a respective one of said plurality of processing units and being connected between said one of said plurality of processing units and said shared bus system, each memory unit having memory cells which can be specified by an address for storing processing results of its corresponding processing unit and processing results of other processing units obtained via said shared bus system, said each memory unit includes write address specifying means for specifying a memory cell for writing data thereto and read address specifying means for specifying a memory cell for reading data therefrom provided independently of each other;

data input means for selecting either data sent from said corresponding processing unit or from said shared bus system to write said data to a memory cell specified by said write address specifying means;

data output means for reading data from the memory cell specified by said read address specifying means during a data writing operation performed by said data input means to the same memory cell; and write information output means for outputting data written by said processing unit to the memory cell within said corresponding memory unit.

12. A parallel processing system, comprising:

a plurality of processing units, a shared bus system and a plurality of memory units, each provided in correspondence to a respective one of said plurality of processing units and being connected between said one of said plurality of processing units and said shared bus system, each memory unit having memory cells which can be specified by an address for storing processing results of its corresponding processing unit and processing results of other processing units obtained via said shared bus system, said each memory unit, having memory cells therein, includes write address specifying means for specifying a memory cell for writing data thereto and read address specifying means for specifying a memory cell for reading data therefrom provided independently of each other;

selecting means for selecting data and an address among data and addresses sent either from a corresponding processing unit or from said shared bus system; and write information output means for outputting data sent from a processing unit to its corresponding memory unit and written to a memory cell therein and to said shared bus system; and wherein each memory unit comprising:

write address specifying means for specifying an address where data is written and writing means for writing data to a memory cell at the specified address; and read address specifying means for specifying a memory cell by its address to read data and data reading means for reading data from said memory cell during the operation of said writing means for writing data to the same memory cell.

13. The shared memory system according to claim 12, further comprising a read data latch, provided in said data reading means of a memory unit, for latching data to be read.

14. A parallel processing system, comprising:

a plurality of processing units, a shared bus system and a plurality of memory units, each provided in correspondence to a respective one of said plurality of processing units and being connected between said one of said plurality of processing units and said shared bus system, each memory unit having memory cells which can be specified by an address for storing processing results of its corresponding processing unit and processing results of other processing units obtained via said shared bus system;

data input means for selecting either data sent from said corresponding processing unit or from said shared bus system to write said data to a memory cell by specifying the address of said memory cell;

data output means for reading data by specifying a memory cell by its address during a data writing operation performed by said data input means to the same memory cell;

write information output means for outputting data written by said processing unit to the memory cell within said corresponding memory unit; and synchronization control means for synchronizing a timing when a processing unit reads data from its corresponding memory unit and a timing for writing data sent from said shared bus system to said corresponding memory unit with on reference clock.

15. A parallel processing system, comprising:

a plurality of processing units, a shared bus system and a plurality of memory units, each provided in correspondence to a respective one of said plurality of processing units and being connected between said one of said plurality of processing units and said shared bus system, each memory unit having memory cells which can be specified by an address for storing processing results of its corresponding processing unit and processing results of other processing units obtained via said shared bus system;

data input means for selecting either data sent from said corresponding processing unit or from said shared bus system to write said data to a memory cell by specifying the address of said memory cell;

data output means for reading data by specifying a memory cell by its address during a data writing operation performed by said data input means to the same memory cell;

write information output means for outputting data written by said processing unit to the memory cell within said corresponding memory unit;

means, provided in each processing unit, for outputting a synchronization request signal which turns from inactive to active when a processing in the processing unit ends; and synchronizing means for permitting the processing unit outputting the synchronization request signal to read data from the memory unit corresponding to that processor when all of the synchronizing processing signals from each of the processing units processing in concert have turned active and when a synchronizing processing completion signal has turned active accordingly.

16. A shared memory system, comprising:

a plurality of memory units, each provided in correspondence to a respective one of a plurality of processing units and being connected between said one of said plurality of processing units and a shared bus system, each memory unit having memory cells which can be specified by an address for storing processing results of its corresponding processing unit and processing results of other processing units obtained via said shared bus system;

selecting means for selecting data and an address among data and addresses sent either from a corresponding processing unit or from said shared bus system;

write information output means for outputting data sent from a processing unit to its corresponding memory unit and written to a memory cell therein and to said shared bus system;

wherein each memory unit comprises:

write address specifying means for specifying an address where data is written and writing means for writing data to a memory cell at the specified address, and read address specifying means and data reading means for specifying a memory cell by its address to read data during the operation of each of the above-mentioned writing means for writing data; and synchronization control means for synchronizing a timing when a processing unit read data from its memory unit and a timing for writing data sent from said shared bus system to said corresponding memory unit with one reference clock.

17. A shared memory system, comprising:

a plurality of memory units, each provided in correspondence to a respective one of a plurality of processing units and being connected between said one of said plurality of processing units and a shared bus system, each memory unit having memory cells which can be specified by an address for storing processing results of its corresponding processing unit and processing results of other processing units obtained via said shared bus system;

selecting means for selecting data and an address among data and addresses sent either from a corresponding processing unit or from said shared bus system;

write information output means for outputting data sent from a processing unit to its corresponding memory unit and written to a memory cell therein and to said shared bus system; and wherein each memory unit comprises:

write address specifying means for specifying an address where data is written and writing means for writing data to a memory cell at the specified address, and read address specifying means and data reading means for specifying a memory cell by its address to read data during the operation of each of the above-mentioned writing means for writing data;

means, provided in each processing unit, for outputting a synchronization request signal which turns from inactive to active when processing in the processing unit ends; and synchronizing means for permitting the processing unit outputting the synchronization request signal to read data from the memory unit corresponding to that processor when all of the synchronizing processing completion signals from each processing unit which performs processing in concert have turned active.

18. A parallel processing system, comprising:

a plurality of processing units, a shared bus system and a plurality of memory units, each provided in correspondence to a respective one of said plurality of processing units and being connected between said one of said plurality of processing units and said shared bus system, each memory unit having memory cells which can be specified by an address for storing processing results of its corresponding processing unit and processing results of other processing units obtained via said shared bus system;

selecting means for selecting data and an address among data and addresses sent either from a corresponding processing unit or from said shared bus system;

write information output means for outputting data sent from a processing unit to its corresponding memory unit and written to a memory cell therein and to said shared bus system;

wherein each memory unit comprises:

write address specifying means for specifying an address where data is written and writing means for writing data to a memory cell at the specified address, and read address specifying means and data reading means for specifying a memory cell by its address to read data during the operation of each of above-mentioned writing means for writing data; and synchronization control means for synchronizing a timing when a processing unit reads data from its corresponding memory unit and a timing for writing data sent from said shared bus system to said corresponding memory unit with on reference clock.

19. A parallel processing system, comprising:

a plurality of processing units, a shared bus system and a plurality of memory units, each provided in correspondence to a respective one of said plurality of processing units and being connected between said one of said plurality of processing units and said shared bus system, each memory unit having memory cells which can be specified by an address for storing processing results of its corresponding processing unit and processing results of other processing units obtained via said shared bus system;

selecting means for selecting data and an address among data and addresses sent either from a corresponding processing unit or from said shared bus system;

write information output means for outputting data sent from a processing unit to its corresponding memory unit and written to a memory cell therein and to said shared bus system;

wherein each memory unit comprises:

write address specifying means for specifying an address where data is written and writing means for writing data to a memory cell at the specified address, and read address specifying means and data reading means for specifying a memory cell by its address to read data during the operation of each of above-mentioned writing means for writing data; and means, provided in each processing unit, for outputting a synchronization request signal which turns from inactive to active when a processing in the processing unit ends; and synchronizing means for permitting the processing unit outputting the synchronization request signal to read data from the memory unit corresponding to that processor when all of the synchronizing processing signals from each of the processing units processing in concert have turned active and when a synchronizing processing completion signal has turned active accordingly.

20. A shared memory system, comprising:

a plurality of memory units, each provided in correspondence to a respective one of a plurality of processing units and being connected between said one of said plurality of processing units and a shared bus system, each memory unit having memory cells which can be specified by an address for storing processing results of its corresponding processing unit and processing results of other processing units obtained via said shared bus system, said each memory unit, having memory cells therein, includes write address specifying means for specifying a memory cell for writing data thereto and read address specifying means for specifying a memory cell for reading data therefrom provided independently of each other;

selecting means for selecting data and an address among data and addresses sent either from a corresponding processing unit or from said shared bus system; and write information output means for outputting data sent from a processing unit to its corresponding memory unit and written to a memory cell therein and to said shared bus system;

wherein each memory unit further includes:
    writing means for writing data to said memory cell at the specified address, and
    data reading means for reading data from a specified address to a memory cell during the operation of said writing means for writing data to the same memory cell.

21. A parallel processing system, comprising:

a plurality of processing units, a shared bus system and a plurality of memory units, each provided in correspondence to a respective one of said plurality of processing units and being connected between said one of said plurality of processing units and said shared bus system, each memory unit having memory cells which can be specified by an address for storing processing results of its corresponding processing unit and processing results of other processing units obtained via said shared bus system, said each memory unit, having memory cells therein, includes write address specifying means for specifying a memory cell for writing data thereto and read address specifying means for specifying a memory cell for reading data therefrom provided independently of each other;

selecting means for selecting data and an address among data and addresses sent either from a corresponding processing unit or from said shared bus system; and write information output means for outputting data sent from a processing unit to its corresponding memory unit and written to a memory cell therein and to said shared bus system; and wherein each memory unit further includes:
    writing means for writing data to said memory cell at the specified address, and
    data reading means for reading data from a specified address of a memory cell during the operation of said writing means for writing data to the same memory cell.

* * * * *